US009389311B1

(12) United States Patent  
Moya et al.

(10) Patent No.: US 9,389,311 B1  
(45) Date of Patent: Jul. 12, 2016

(54) SUPERPIXEL EDGES FOR BOUNDARY DETECTION

(71) Applicant: Sandia Corporation, Albuquerque, NM (US)

(72) Inventors: Mary M. Moya, Albuquerque, NM (US); Mark W. Koch, Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 0 days.

(21) Appl. No.: 14/927,066

(22) Filed: Oct. 29, 2015

Related U.S. Application Data

(63) Continuation-in-part of application No. 14/626,582, filed on Feb. 19, 2015.

(51) Int. Cl.
| | |
|---|---|
| *G01S 13/90* | (2006.01) |
| *G06T 7/00* | (2006.01) |
| *G06K 9/62* | (2006.01) |
| *G06T 11/60* | (2006.01) |

(52) U.S. Cl.  
CPC .............. *G01S 13/90* (2013.01); *G06K 9/6202* (2013.01); *G06T 7/0024* (2013.01); *G06T 11/60* (2013.01)

(58) Field of Classification Search  
CPC ..... G01S 13/90; G01S 17/89; G01S 13/9035; G06K 9/6202; G06K 9/4609; G06K 9/6212; G06T 11/60; G06T 7/0024; G06T 3/4053  
USPC ................................ 342/25 A–25 F, 191, 195  
See application file for complete search history.

(56) References Cited

U.S. PATENT DOCUMENTS

| | | | | |
|---|---|---|---|---|
| 8,265,870 B1* | 9/2012 | Nguyen | ................... | G01V 1/24 701/450 |
| 9,239,384 B1* | 1/2016 | Chow | ................... | G01S 13/9035 |
| 2012/0197439 A1* | 8/2012 | Wang | ................... | B25J 9/1689 700/259 |
| 2015/0170526 A1* | 6/2015 | Wang | ................... | B64C 19/00 701/16 |

(Continued)

FOREIGN PATENT DOCUMENTS

WO  WO 2015132726 A1 * 9/2015 .............. G01S 17/89

OTHER PUBLICATIONS

Chen, et al., "Oil Spill Detection based on a Superpixel Segmentation Method for SAR Image", IEEE Geoscience and Remote Sensing Symposium (IGARSS), 2014, pp. 1725-1728.

(Continued)

*Primary Examiner* — John B Sotomayor  
(74) *Attorney, Agent, or Firm* — Medley, Behrens & Lewis, LLC

(57) ABSTRACT

Various embodiments presented herein relate to identifying one or more edges in a synthetic aperture radar (SAR) image comprising a plurality of superpixels. Superpixels sharing an edge (or boundary) can be identified and one or more properties of the shared superpixels can be compared to determine whether the superpixels form the same or two different features. Where the superpixels form the same feature the edge is identified as an internal edge. Where the superpixels form two different features, the edge is identified as an external edge. Based upon classification of the superpixels, the external edge can be further determined to form part of a roof, wall, etc. The superpixels can be formed from a speckle-reduced SAR image product formed from a registered stack of SAR images, which is further segmented into a plurality of superpixels. The edge identification process is applied to the SAR image comprising the superpixels and edges.

20 Claims, 16 Drawing Sheets

(56) References Cited

U.S. PATENT DOCUMENTS

| | | | | |
|---|---|---|---|---|
| 2015/0279049 | A1* | 10/2015 | Tojo | G06T 7/2053 382/164 |
| 2015/0286340 | A1* | 10/2015 | Send | G01S 17/46 345/175 |
| 2015/0332127 | A1* | 11/2015 | Zheng | G06K 9/627 382/165 |
| 2016/0047903 | A1* | 2/2016 | Dussan | G01S 7/484 356/5.01 |
| 2016/0055237 | A1* | 2/2016 | Tuzel | G06F 17/30707 382/224 |

OTHER PUBLICATIONS

Karthick et. al., "SAR Image Segmentation Based On Hierarchical Merging Method", International Journal of Innovative Research in Science, Engineering and Technology, vol. 3, Issue 3, Mar. 2014, pp. 1263-1268.

Narumalar, et al., "Design of Multi-region SAR Segmentation by Parametric", International Journal of Innovative Research in Computer and Communication Engineering, vol. 2, Issue 1, Mar. 2014, pp. 3922-3928.

Kim, et al, "Traversability Classification for UGV Navigation: A Comparison of Patch and Superpixel Representations", IEEE Intelligent Robots and Systems, IROS 2007, 2007, pp. 1-8.

Steinbach, et al., "Building Detection in SAR Imagery", Sandia National Laboratories, USA—Report #: SAND2014-16584R, 2014, pp. 1-11.

* cited by examiner

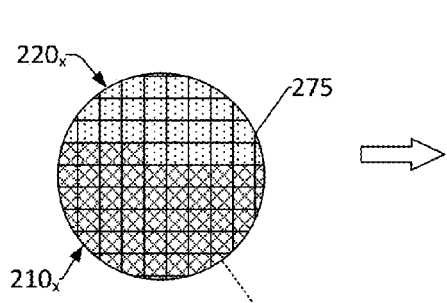
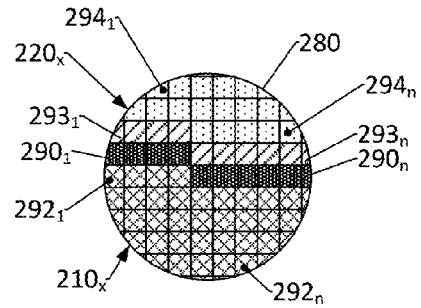
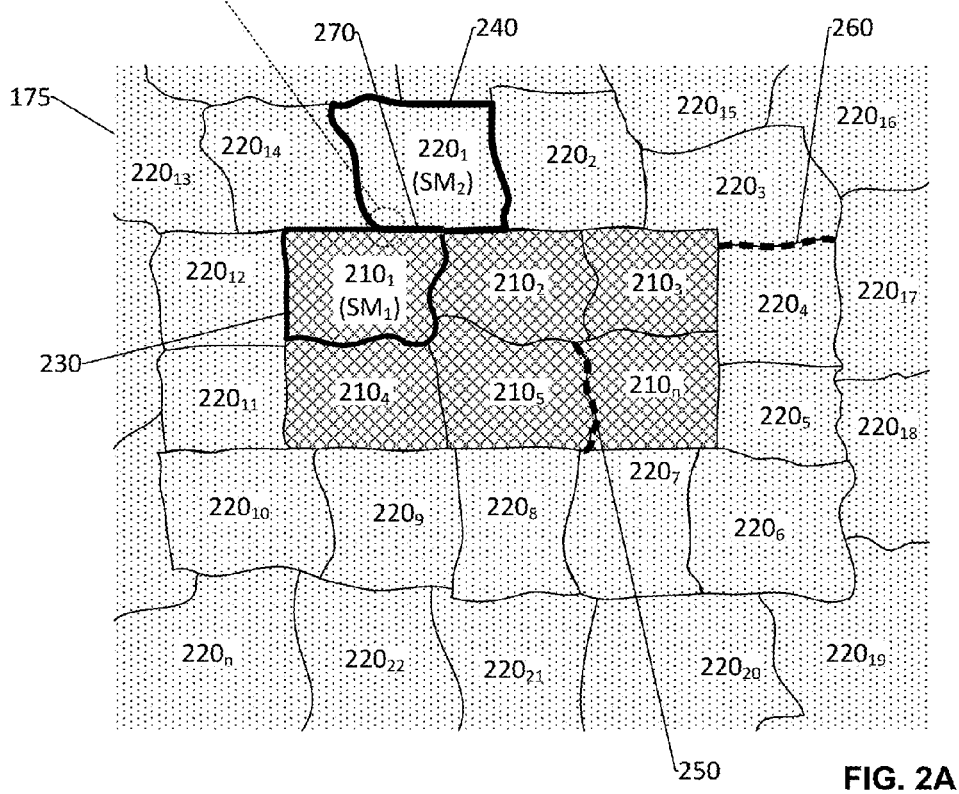
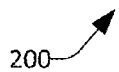

SUPERPIXEL EDGES FOR BOUNDARY DETECTION

RELATED APPLICATION

This application is a continuation in part of U.S. patent application Ser. No. 14/626,582, filed on Feb. 19, 2015, and entitled "SUPERPIXELS FOR IMPROVED STRUCTURE AND TERRAIN CLASSIFICATION USING MULTIPLE SYNTHETIC APERTURE RADAR IMAGE PRODUCTS" which claims priority to U.S. Provisional Patent Application No. 61/942,532, filed on Feb. 20, 2014, and entitled "SUPERPIXELS FOR IMPROVED STRUCTURE AND TERRAIN CLASSIFICATION USING MULTIPLE SYNTHETIC APERTURE RADAR IMAGE PRODUCTS", the entireties of which are incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Synthetic aperture radar (SAR) images provide a wealth of information about structures and activities in an imaged scene. During the production of high-resolution, single-polarization SAR imagery, much more data and/or imagery is generated than available researchers and analysts can examine. Thus, automating the recognition of objects and/or features, and their edges/boundaries in SAR imagery is highly desired, e.g., to augment manual visual analysis. Superpixel segmentation (SPS) algorithms can be utilized to divide an image into small regions of close proximity pixels having similar intensities. Applying these SPS algorithms to optical images can reduce image complexity, enhance statistical characterization, and improve segmentation and categorization of scene objects and features. SPS algorithms typically require high signal-to-noise-ratio (SNR) images with low artifacts for accurate segmentation. SAR imagery, however, tends to include speckle, a product of coherent combining and cancelling of multi-path backscattered radar energy, which can complicate the extraction of superpixel segments and even preclude SPS usage.

SUMMARY

The following is a brief summary of subject matter that is described in greater detail herein. This summary is not intended to be limiting as to the scope of the claims.

Various embodiments presented herein relate to automating determination of superpixel boundaries (edges) and whether a superpixel boundary, or portion thereof, is an internal edge or an external edge. An internal edge identifies the boundary is shared between two superpixels which have similar radar-reflecting properties that are consistent with originating from the same object (or portion thereof). An external edge identifies the boundary is shared between two superpixels wherein the first superpixel and second superpixel have highly contrasting radar-reflecting properties that are consistent with originating from the first superpixel originating from a whole, or a portion, of a first object, and the second superpixel from a whole, or a portion, of a second object. In an embodiment, the first object can be a man-made structure, e.g., a building, while the second object can be a natural feature such as a region of grass that is adjacent to the first object.

In an embodiment, each pixel in a superpixel can be tagged with an identifier (ID) for the superpixel. Thus, pixels of a first superpixel are tagged with an ID of the first superpixel, and pixels of a second superpixel are tagged with an ID of the second superpixel. The first superpixel can have at least one property assigned thereto, wherein the at least one property can be based upon one or more values generated from one or more properties of pixels forming the first superpixel. The second superpixel can have at least one other property assigned thereto, wherein the at least one other property can be based upon one or more values generated from one or more properties of pixels forming the second superpixel. The respective properties can be based upon one or more processes which are utilized to form the superpixels, as further described.

In an embodiment, edge pixels can be found by determining a first pixel has a different superpixel ID to a second, adjacent pixel. Further, once the edge pixels have been identified, the first superpixel property of the first edge pixel and the second superpixel property of the second edge pixel can be compared to determine whether the first superpixel and the second superpixel are consistent with containing the same reflecting surface/feature or a different reflecting surface/feature. For example a first mean of the first superpixel can be compared with a second mean of the second superpixel using a ratio-contrast measure. If the ratio contrast measure is less than a threshold, the first superpixel and the second superpixel can be determined to be consistent with originating from the same object, and the edge between them is determined to be an internal edge. If the ratio contrast measure is equal to, or above the threshold, the first superpixel can be determined to be consistent with originating from a first object and the second superpixel can be determined to be consistent with originating from a different, second object, and the edge between them is determined to be an external edge. For example, the first object is a building and the edge of the first superpixel is determined to delineate a structural edge (e.g., a wall, a roof, etc.) of the building.

The various embodiments presented herein can be applied to a SAR image that has undergone speckle reduction. A SAR image can include speckle, which is a deterministic artifact commonly found in SAR imagery. When a superpixel segmentation (SPS) algorithm is executed over the SAR image, the speckle in the SAR image impacts segmentation of the SAR image. That is, the speckle causes superpixels output by the SPS algorithm to be different from what the SPS algorithm would output if the SAR image were free of speckle. Accordingly, speckle can negatively impact operation of the SPS algorithm.

Therefore, the various embodiments presented herein relate to mitigating the deleterious effects of speckle during SPS to enable enhanced superpixel formation and according edge detection. Prior to executing an SPS algorithm over the SAR image (e.g., in its original form), a speckle reduction process can be undertaken over the SAR image, resulting in a speckle-reduced SAR image product. Exemplary speckle-reduction processes include, but are not limited to, a sub-aperture multilook (SA-ML) process, a mean coherent change detection (MCCD) process, and a median radar cross section (MRCS) process. Other processes can also be executed, such as an interferometric height (IF-H) mapping process. One or more of these processes, in addition to reducing speckle, also reduces spatial resolution. Therefore, the speckle-reduced SAR image product can have a resolution that is lower than the resolution of the SAR image.

The SPS algorithm can then be executed over the speckle-reduced image product, resulting in oversegmentation of the speckle-reduced image product into a plurality of segments, wherein oversegmentation can result in one or more of the segments in the plurality of segments being smaller than an object which each respective segment forms a respective part. Each segment comprises at least one pixel (and typically includes several pixels), where pixels in a segment have been found by the SPS algorithm to be related to one another. It can be ascertained that since the speckle-reduced image product has less speckle when compared to the original SAR image, the oversegmentation performed by the SPS algorithm will be less influenced by speckle. The segmented, reduced-speckle image product can be referred to as a superpixel image product.

In an embodiment, the superpixel image product can be formed from a speckle-reduced product that is registered with the original SAR image; accordingly, the superpixel image product is likewise registered with the original SAR image. Registration of the superpixel image product with the original SAR image causes the segments of the superpixel image product to be applicable to the original SAR image. Effectively, then, the original SAR image, and all other images registered with the superpixel image product, can be oversegmented into segments that respectively correspond to the segments of the superpixel image product. The oversegmented original SAR image is referred to as the segmented image.

Segments in the segmented image can subsequently be assigned labels based upon values of pixels in respective segments. With more particularity, a classifier can assign a label to a segment in the segmented image based upon values of pixels in the segment (without regard to values of pixels in other segments). For example, the classifier can be trained based upon labeled training data, such as manually identified segments that correspond to an object or feature of interest. Thus, for instance, the classifier can be trained based upon segments (of SAR images) manually identified as including a particular type of surface (e.g., a concrete building). The classifier, when provided with a segment from the segmented image, can output a value that is indicative of whether or not the segment includes a concrete building, and the classifier can label the segment as including (or not including) the concrete building based upon the value. The value output by the classifier, as noted above, is based upon values of pixels in the segment.

As previously mentioned, the one or more properties ascribed to the first superpixel and the second superpixel can be generated based upon the SA-ML process, the MCCD process, the MRCS process, the IF-H mapping process, a simple linear iterative clustering (SLIC) operation, a QUICK-SHIFT process, and/or any other process pertaining to the generation and/or processing of superpixels in a SAR image.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 2A is a schematic of a SAR image comprising a plurality of superpixels and internal/external edges related thereto.

FIG. 2B is a schematic of a zoomed-in portion of a SAR image illustrating pixels included in a pair of superpixels and edges related thereto.

FIG. 2C is a schematic of a zoomed-in portion of a SAR image illustrating identified edge pixels.

DETAILED DESCRIPTION

Figure 1:
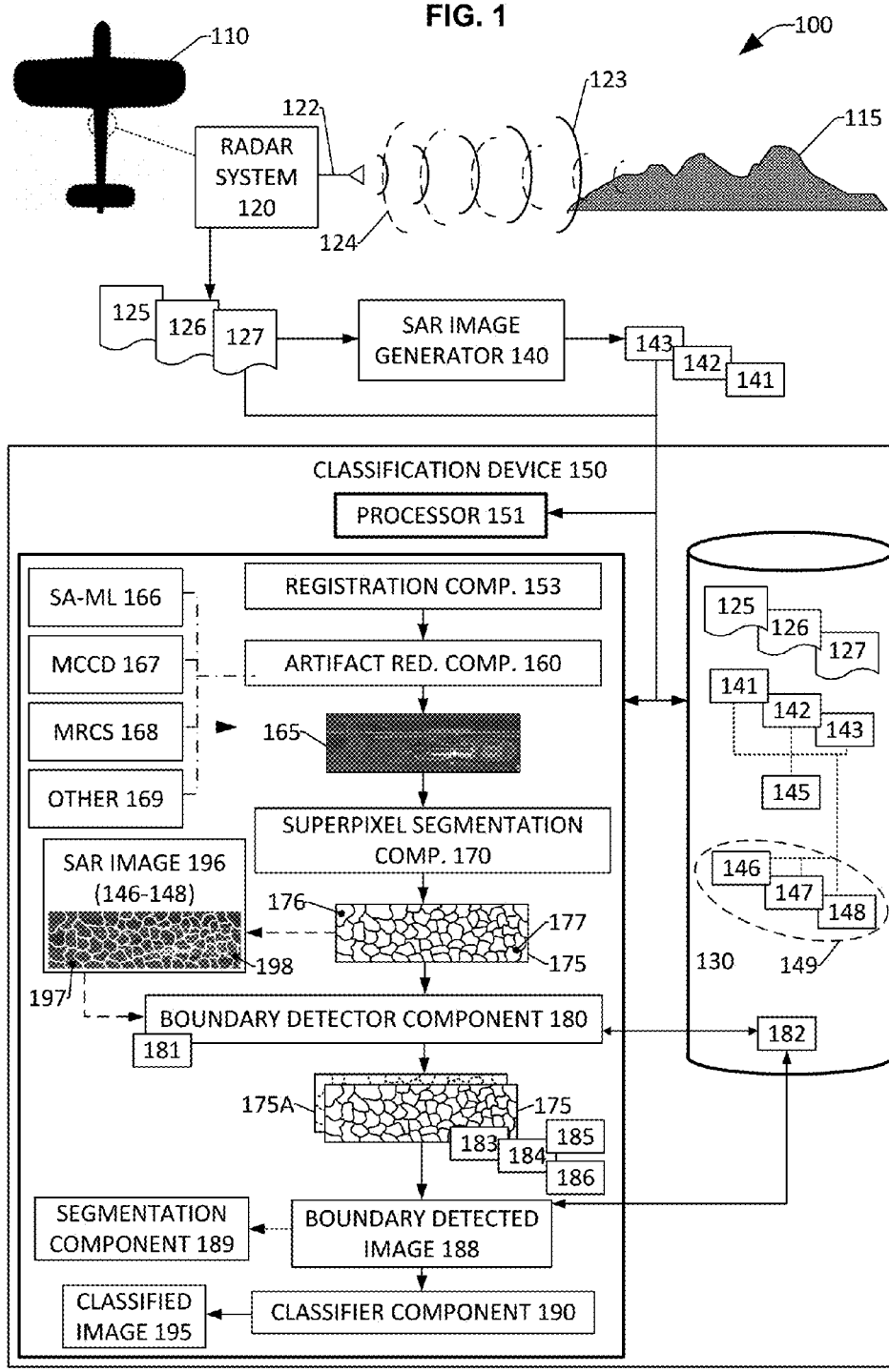
FIG. 1 illustrates an exemplary system for determining an internal and/or external edge for a superpixel(s) in a SAR image, where the superpixel(s) is based upon a speckle-reduced SAR image product.

Various technologies pertaining to identifying high- and low-contrast edges in a SAR image, wherein the SAR image may include speckle, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As used herein, the terms "component", "device", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component", "device", and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

SAR imaging systems deliver complex phase history data, which pass through Fourier transform processing to produce complex-valued backscatter images. Because multi-path backscattered energy can add and cancel coherently, resulting SAR images can include speckle, which can complicate application of standard image processing methods, such as superpixel segmentation (SPS), to SAR images.

FIG. 1 illustrates an exemplary system 100 that is configured to determine high- and low-contrast edges in a SAR image, where the superpixels are determined based upon a speckle-reduced SAR image product. FIG. 1 depicts an aircraft 110 navigating a scene 115, e.g., the aircraft 110 is flying in accordance with a known flight path(s) having a defined geometry relative to the scene 115.

The aircraft 110 has located thereon a radar system 120, which includes an antenna 122. The antenna 122 transmits radar signals 123, and the antenna 122 (or another antenna) receives radar echoes 124, which have been generated by reflection of the radar signals 123 from the scene 115. Transmission of the signals 123 can be performed in conjunction with a controller (not shown) incorporated into the radar system 120, wherein the controller can be a digital signal processor or other suitable circuit or processor.

For each pass of the aircraft 110 over the scene 115, data can be generated by the radar system 120, e.g., during a first pass of the aircraft 110 over the scene 115, the radar system 120 generates a first set of data 125, during a second pass of the aircraft 110 over the scene 115, the radar system 120 generates a second set of data 126, during an $n^{th}$ pass of the aircraft 110 over the scene 115, the radar system 120 generates a $n^{th}$ set of data 127, etc., where n is a positive integer. In an embodiment, the sets of data 125, 126, and 127 can be or include phase history data. Further, the sets of data 125, 126, and 127 can be in any suitable format, such as Ground-Based SAR Application Testbed File Format (GFF).

The system 100 comprises a classification device 150, which can be any suitable computing device, including but not limited to a desktop computing device, a laptop computing device, a mobile telephone, a wearable computing device, a server computing device, etc. The classification device 150 is in direct or indirect communication with the radar system 120, such that data generated by the radar system 120 (or data based upon data generated by the radar system 120) can be received at the classification device 150. For instance, the classification device 150 can be co-located with the radar system 120 on the aircraft. In another example, the classification device 150 can be located separately from the radar system 120. The classification device 150 comprises a data store 130, and the respective sets of data 125-127 can optionally be stored in the data store 130 for subsequent retrieval.

The system 100 also includes a SAR image generator 140 that is configured to generate (complex) SAR images 141, 142, and 143, based upon at least one of the data 125-127 (e.g., where the data 125-127 includes complex phase history data). The image generator 140 can exploit different phenomena of the complex backscatter data to produce the SAR images 141, 142 and 143. While shown as being separate from the classification device 150 and the radar system 120, it is to be understood that the SAR image generator 140 may be included in either of the classification device 150 or the radar system 120. The respective SAR images 141-143 can be stored in the data store 130 for subsequent retrieval.

The classification device 150 includes a processor 151 and a memory 152. The memory 152 includes components that are executable by the processor, wherein functionalities of the process, when executing the components, are described below.

The memory 152 includes a registration component 153 that can be configured to register the SAR images 141-143. In an embodiment, a SAR baseline image 145 can be selected from any of the SAR images 141-143 collected from the same scene 115. The registration component 153 can be then be configured to register each of the remaining SAR images 141-143 with the baseline SAR image 145, thereby forming a mapping between the baseline SAR image 145 and any of the SAR images 141-143, and thereby producing registered SAR images 146, 147, and 148, referred to collectively as a registered image stack 149. It is to be appreciated that while the registration component 153 is shown as being separate from the radar system 120, the registration component 153 may be included in either of the classification device 150 or the radar system 120. As shown, the registered image stack 149 can be stored in the data store 130 for subsequent retrieval.

In a situation where any of the SAR images 141-143 has a different resolution to any of the other SAR images, the registration component 153 can optionally be configured to resample any of the SAR images to enable the SAR images to have a common resolution. For example, when the SAR image 141 comprises x pixels and the SAR image 142 comprises y pixels, the registration component 153 can resample the SAR image 141 such that the SAR image 141 comprises y pixels.

The memory 152 can also include an artifact reduction component 160, wherein the artifact reduction component 160 is configured to generate an artifact-reduced image product 165 based upon at least one of the registered SAR images 146-148 in the registered image stack 149. In a scenario where noise contamination may be an issue for processing of SAR images 141-143, the artifact reduction component 160 can also be configured to reduce noise in at least one of the registered SAR images 146-148. For purposes of explanation, functionality of the components in the memory 152 will be described with reference to the registered SAR image 146, although it is to be understood that the functionality can be performed over other registered SAR images (e.g., registered SAR images 147, 148) in the registered image stack 149. The artifact reduction component 160 can be configured to generate the artifact-reduced SAR image product 165 based upon the registered SAR image 146, such that an amount of artifact(s) in the artifact-reduced SAR image product 165 is less than the amount of artifact(s) in the registered SAR image 146. The artifact-reduced SAR image product 165 can be perceived as an image comprising a plurality of pixels, wherein each pixel has a value or vector of values assigned thereto.

In a non-limiting example, the artifact reduction component 160 can be configured to perform at least one speckle-reduction operation over the registered SAR image 146, such that the artifact-reduced SAR image product 165 is a speckle-reduced image product. Accordingly, an amount of speckle in the artifact-reduced SAR image product 165 can be less than an amount of speckle in the (original) registered SAR image 146. Exemplary operations that can be performed by the artifact reduction component 160 include, but are not limited to, sub-aperture multilook imaging (SA-ML) 166, mean-over-time of coherent change detection (MCCD) imaging 167, and median-over-time of radar cross section (MRCS) imaging 168. The artifact reduction component 160 can also be configured to perform other operations 169 over the registered SAR image 146, such as an operation that generates interferometric height (IF-H) map data, which can be indicative of local height variations in the scene 115, and can augment available backscatter and coherent change information. In an embodiment, the SA-ML imaging 166 can reduce spatial resolution to reduce speckle while MCCD imaging 167 and MRCS imaging 168 can average values over time rather than over space, hence spatial resolution is preserved while speckle is reduced. In another embodiment, MCCD imaging 167 and MRCS imaging 168 can have the same spatial resolution as an originally received image 141-143, while SA-ML imaging 166 can have reduced spatial resolution from the originally received image 141-143. The exemplary speckle reduction operations are described in greater detail below.

It is to be appreciated that the artifact reduction component 160 can generate the artifact-reduced SAR image product 165 using a single artifact reduction operation (e.g., any of operations 166-169) or a combination of artifact reduction operations (e.g., a combination of operations 166-169). For example, the artifact-reduced SAR image product 165 can be a plurality of image products that are registered to one another. For instance, conceptually, the artifact-reduced SAR image product 165 can have a plurality of pixels, with each pixel in the artifact-reduced SAR image product 165 having a vector of values, and each value in the vector corresponding to a respective artifact reduction operation. Thus, a pixel in the artifact-reduced SAR image product 165 can have the vector of values [A, B, C] assigned thereto, where A is based upon an output of a first artifact-reduction operation relative to the registered SAR image 146, B is based upon an output of a second artifact-reduction operation relative to the registered SAR image 146, and C is based upon an output of a third artifact reduction operation relative to the registered SAR image 146. Additionally, each pixel in the artifact-reduced product 165 can have spatial values (e.g., range and azimuth coordinates) assigned thereto, which represent location of the pixel in the artifact-reduced SAR image product 165. It is to be appreciated that, since the artifact-reduced SAR image product 165 was created from one or more registered images 146-148, the artifact-reduced image product 165 is also registered to the baseline image 145 as well as all other registered images 146-148 in the stack 149.

The memory 152 can further comprise a superpixel segmentation component 170 that is configured to segment the artifact-reduced SAR image product 165 into a plurality of superpixels (or segments) based upon respective values of respective pixels of the artifact-reduced SAR image product 165. For example, the superpixel segmentation component 170 can be configured to perform a pixel clustering operation on the artifact-reduced SAR image product 165, such that a plurality of superpixels (pixel groupings) are formed (and hence the artifact-reduced SAR image product 165 is segmented into the plurality of superpixels). The superpixel segmentation component 170 therefore divides (oversegments) the artifact-reduced SAR image product 165 into a plurality of superpixels, thus producing a superpixel image product 175. The superpixel image product 175, as noted above, comprises a plurality of superpixels 176, each comprising a respective boundary 177, where each superpixel includes pixels of the artifact-reduced SAR image product 165 found to be correlated by the pixel clustering operation (e.g., proximate pixels having a similar value) performed by the superpixel segmentation component 170. Exemplary pixel clustering algorithms that can be utilized by the superpixel segmentation component 170 when oversegmenting the artifact-reduced product 165 into a plurality of superpixels include, but are not limited to, a QUICK-SHIFT algorithm and a simple linear iterative clustering (SLIC) algorithm. Because the SLIC operation performed by the superpixel segmentation component 170 can be forced to select edges parsimoniously, under such forced condition, the SLIC operation is required to choose between higher contrast edges that correspond to scene structures and spurious and noisy edges that frequently have lower contrast. Hence, in addition to detecting high-contrast edges, superpixels with their edges and edge statistics provide a number of useful advantages when applied to SAR imagery. For example, parsimoniously-selected superpixels can conform to the shape of structures in the scene 115. It is to be appreciated that, since the superpixel image product 175 was created from the artifact reduced SAR image product 165, that it too is registered to all other registered images 146-148.

In an embodiment, owing to the oversegmentation operation performed by the superpixel segmentation component 170 (e.g., SLIC, QUICK-SHIFT, etc.), each respective pixel in a superpixel has a similar value. For example, a first group of pixels forming a first superpixel have a similar (common) parameter value, e.g., a first statistical measure ($SM_1$) could be a first mean or median value of all pixels which form the first superpixel, and the first superpixel is assigned the first statistical value for the first statistical measure. A second group of pixels in a second superpixel also have a similar (common) parameter value, e.g., a second statistical measure ($SM_2$) could be a second mean or median value for all pixels which form the second superpixel, and the second superpixel is assigned the second statistical value for the second statistical measure.

The superpixel segmentation component 170 can be configured to assign the respective statistical values ($SM_1$, $SM_2$, $SM_n$ for an $n^{th}$ superpixel) to the respective superpixels, as further described below. It is to be appreciated that while only a first superpixel and a second superpixel are described herein, with the respective statistical values assigned thereto, any number of superpixels having respective statistical values can be included in the superpixel image product 175.

Furthermore, superpixel segmentation component 170 can be configured to apply a unique superpixel identifier (ID) to each superpixel in the superpixel image product 175. As further described below, a shifting algorithm can find transitions from one superpixel ID to another, wherein such transitions correspond to respective superpixel boundaries.

The memory 152 further comprises a boundary detector component 180, which can receive the segmented SAR image 175 and based upon computing a contrast comparison between the respective statistical value(s) (e.g., statistical values $SM_1$, $SM_2$, $SM_n$) assigned to each superpixel, the boundary detector component 180 can identify whether a superpixel boundary 177 (or portion thereof) represents a high contrast edge consistent with an external edge of an object represented by one or more superpixels, or the superpixel boundary 177 represents a low-contrast edge consistent with an internal edge of an object represented by the one or more superpixels.

As further described below, the boundary detector component 180 can utilize the superpixel image product 175, and a copy of the superpixel image product 175A to identify whether a pixel in the superpixel image product 175 is included in the body of a superpixel (e.g., the pixel is not of the edge of the superpixel) or the pixel is located at the edge of the superpixel. The superpixel image product 175 can include a first superpixel (having a first superpixel ID) and an adjacently located second superpixel (having a second superpixel ID). Further, the first superpixel can include a first pixel which is located at the edge of the first superpixel, and the second superpixel can include a second pixel which is located at the edge of the second superpixel, wherein the first pixel and the second pixel are adjacent to each other. Similarly, the superpixel image product copy 175A can include a third superpixel (a copy of the first superpixel) and an adjacently located fourth superpixel (a copy of the second superpixel). Further, the third superpixel can include a third pixel (a copy of the first pixel) which is located at the edge of the third superpixel, and the second superpixel can include a fourth pixel (a copy of the second pixel) which is located at the edge of the fourth superpixel, wherein the third pixel and the fourth pixel are also adjacent to each other. The superpixel image product copy 175A can be overlaid (co-aligned) on the superpixel image product 175 such that the third pixel in the superpixel image product copy 175A is located directly over the first pixel in the superpixel image product 175, and the fourth pixel is located over the second pixel. Subsequently, the superpixel image product copy 175A can be shifted (e.g., by the boundary detector component 180 utilizing a shifting algorithm 181) in relation to the underlying superpixel image product 175, such that the fourth pixel is overlaid over the first pixel (or the third pixel is overlaid over the second pixel). Owing to the first pixel having the first superpixel ID and the fourth pixel having the second superpixel ID, the boundary detector component 180 can determine that the first pixel and the fourth pixel are located in different superpixels, and thus, the first pixel and the fourth pixel are both edge pixels of their respective superpixels. The same determination can be made for the second pixel overlaid with the third pixel. A boundary detected image 188 can be generated by the boundary detector component 180, wherein the boundary detected image 188 comprises superpixels and their respectively identified edge pixels. Further, an index array 182 can be generated from the shifting process to identify every superpixel edge location and to further store the superpixel statistics in the corresponding edges.

Turning to FIGS. 2A-2C, a superpixel image product 175 comprising of a plurality of superpixels is illustrated in configuration 200. A first plurality of superpixels, e.g., superpixels $210_1$-$210_n$ are shown, wherein (per the common shading) the superpixels $210_1$-$210_n$ all have similar statistical measures (e.g., a similar first mean radar-reflectivity), a first statistical measure, $SM_1$. Further, a second plurality of superpixels, e.g., superpixels $220_1$-$220_n$ are shown, wherein (per the common shading) the superpixels $220_1$-$220_n$ all have a similar statistical measure (e.g., a similar second mean radar-reflectivity), a second statistical measure, $SM_2$. Per the foregoing, the identifiers $210_1$-$210_n$ and $220_1$-$220_n$ can act as the respective IDs utilized to identify superpixels associated with a particular superpixel boundary.

As previously described, each superpixel $210_1$-$210_n$ and $220_1$-$220_n$ can be constrained by a respective superpixel boundary (e.g., superpixel boundary 177). As shown in FIG. 2A, a first superpixel $210_1$ has a boundary 230, while a second superpixel $220_1$ has a boundary 240. A boundary, e.g., boundary 230 or 240, can comprise a plurality of pixels. As further shown in FIG. 2A, a portion of a superpixel boundary can separate a first superpixel from a second superpixel. For example, a boundary portion 250 separates superpixel $210_5$ and superpixel $210_n$ (as indicated by the hashed line). In another example, boundary portion 260 separates superpixel $220_3$ and superpixel $220_4$ (as indicated by the hashed line). Boundary portions 250 and 260 are internal edges between respective common superpixels, e.g., boundary portion 250 separates a pair of superpixels 210, while boundary portion 260 separates a pair of superpixels 220. A boundary portion can also separate superpixels of different groups, e.g., boundary portion 270 (as indicated by the hashed line) separates a first superpixel $210_1$ (e.g., of a first group) and a second superpixal $220_1$ (e.g., of a second group). As shown, the boundary portion 270 forms a portion of an external edge between the group of superpixels $210_1$-$210_n$ and the surrounding group of superpixels $220_1$-$220_n$.

As shown in FIG. 2B, zoomed portion 275, a first portion of superpixels $210_x$ are depicted (per the first common shading) next to a second portion of superpixels $220_x$ (per the second common shading), wherein the first portion of superpixels $210_x$ (e.g., $210_1$) and the second portion of superpixels $220_x$ (e.g., $220_1$) form a part of the boundary portion 270. As further described herein, superpixel boundaries can be found by comparing a pixel with its neighboring pixels; a superpixel label image (e.g., images 175 and 175A) can be shifted up, down, left and right with respect to itself with comparison of respective superpixel IDs. If it is determined that the pixels all have the same superpixel ID then the pixels are common to a superpixel. However, if one of the pixels is determined to have a different superpixel ID to the superpixel ID of a neighboring superpixel, the respective pixels can be identified as being edge pixels of the respective superpixels. After shifting all pixels and comparing IDs at each image shift, it is possible to identify edge pixels for each superpixel. In an embodiment, the superpixel label image only has to be shifted by one pixel width relative to itself in each of the up, down, left, right directions for a dissimilarity between neighboring pixels to be determined.

Turning to FIG. 2C, zoomed portion 280, a plurality of edge pixels are depicted from the respective superpixels which create the boundary portion 270. FIG. 2C provides a schematic of respective edge pixels after edge pixel determination has been performed per the various embodiments presented herein. As illustrated, a row/line of pixels $290_1$-$290_n$ have been determined to be edge pixels of a first superpixel boundary (or edge) of the first superpixel $210_x$ (e.g., $210_1$), wherein the first superpixel $210_x$ also includes the pixels $292_1$-$292_n$. Further, pixels $293_1$-$293_n$ are edge pixels of a second superpixel boundary of the second superpixel $220_x$ (e.g., $220_1$), wherein the second superpixel $220_x$ also includes the pixels $294_1$-$294_n$. Each section of the superpixel boundary that borders a different superpixel will receive a different ID that corresponds to its specific neighbor. Accordingly, each pixel $290_1$-$290_n$ in the first superpixel boundary can be assigned an ID that matches the ID of the bordering superpixel $220_x$, each pixel $293_1$-$293_n$ in the second superpixel boundary can be assigned an ID that matches the ID of the bordering superpixel $210_x$, therein identifying the respective pixels in the first superpixel boundary and the second superpixel boundary. It is to be appreciated that while edge pixels $290_1$-$290_n$ and the pixels $292_1$-$292_n$ have different shadings in FIG. 2C, all of the pixels belong to the superpixel $210_x$. And further, while edge pixels $293_1$-$293_n$ and the pixels $294_1$-$294_n$ have different shadings in FIG. 2C, all of the pixels belong to the superpixel $220_x$.

Figure 3A:
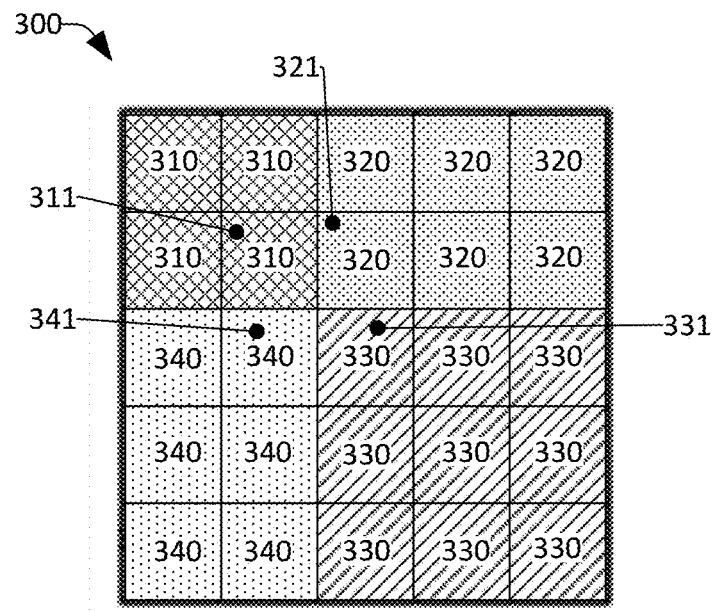
FIG. 3A is a schematic of a superpixel label image comprising superpixels generated with a constrained SLIC algorithm (4 direction).
Figure 3B:
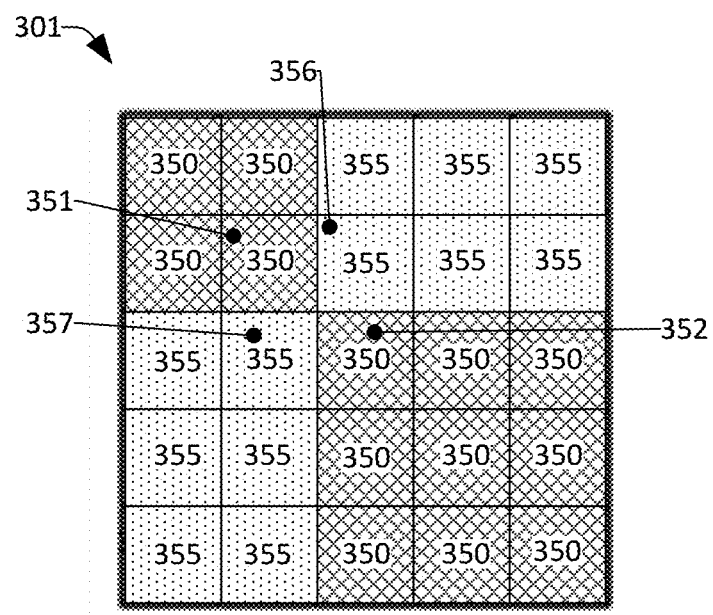
FIG. 3B is a schematic of a superpixel label image comprising superpixels generated with an unconstrained SLIC algorithm (8 direction).

FIGS. 3A and 3B illustrate simplified schematics of respective superpixel label images 300 and 301 (e.g., superpixel image product 175), both comprising a plurality of pixels labeled with their respective superpixel IDs, which can be utilized for detecting superpixel edges. Image 300 comprises a first superpixel 310 containing 4-connected pixels, and further, superpixels 320, 330 and 340 also contain 4-connected pixels. As previously mentioned, when utilizing SLIC in the pixel segmentation operation (e.g., by the superpixel segmentation component 170), the SLIC operation can be configured to enforce that all pixels belonging to a single superpixel are connected to at least one of 4 immediate neighboring pixels (in the up, down, left and right directions) and excluding diagonal connections. The superpixel label image 300 contains superpixels comprised of 4-connected pixels. In contrast, the superpixel label image 301 serves as a counter-example. The superpixels 350 and 355 both contain 8-connected pixels, wherein the pixels within each superpixel can be diagonally connected. For example, in configuration 300, the 4-connected pixel SLIC operation ensures that pixels 311 and 331 are from different superpixels (superpixels 310 and 330, respectively), and further, pixels 321 and 321 are ensured to be from different superpixels (superpixels 320 and 340, respectively). However, with reference to configuration 301, it is possible for pixels 351 and 352 to be identified as being from the same superpixel (superpixel 350) and further, pixels 356 and 357 to be identified as being from the same superpixel (superpixel 355), owing to the ability for diagonal pixels to be labeled with common superpixel IDs.

As mentioned, the superpixel segmentation component 170 can be configured to limit a number of superpixels generated, and thereby force the available superpixel edges to favor high-contrast intensity changes within a local region, thus ensuring parsimonious placement of edges. As previously described, the pixels of superpixel 310 will have a first superpixel ID, the pixels of superpixel 320 will have a second superpixel ID, the pixels of superpixel 330 will have a third superpixel ID, the pixels of superpixel 340 will have a fourth superpixel ID. As further mentioned, the superpixel label image 300 (e.g., images 175 and 175A) can be shifted up, down, left and right with respect to itself, to enable extraction of locations where a first superpixel ID label(s) of a superpixel (e.g., of an adjacent superpixel) do not match with a second superpixel ID label(s) assigned to the superpixel in question. For those pixels (e.g., at a first superpixel 310) at which there is a label mismatch with an adjacent pixel (e.g., at a second superpixel 320), the pixels can be identified as corresponding to the edges of each superpixel that border another superpixel.

The edge pixels, once identified, can be further analyzed to determine whether they are external edge pixels or internal edge pixels. For example, a first superpixel j (e.g., superpixel 310) has a different statistical value ($SM_1$) to a second superpixel k (e.g., superpixel 320) having a second statistical measure ($SM_2$), as determined by the computation of the contrast measure (i.e., thresholding the contrast measure produces a ratio edge detector) $r_{jk}$, per Eqn 1:

$$r_{jk} = 1 - \min\left(\frac{SM_j}{SM_k}, \frac{SM_k}{SM_j}\right) \quad (1)$$

where contrast values close to 0 indicate that the superpixels have very similar statistics and contrast values close to 1 indicate that the superpixels have very different statistics. Utilization of Eqn. 1 is described further below in conjunction with Eqns. 2-5. Hence, when determining the contrast of each edge, the boundary classifier component 180 can determine whether the pixels are of an external edge or an internal edge, as further described below.

Applying ratio contrast boundary detection identifies high-contrast binary edges, which provide a convenient format for applying a Hough transform or a Radon transform to detect linear boundaries and other boundaries with specific mathematical shapes. Long and thin objects tend to create long, thin superpixels, for which it is possible to estimate a ratio of major-axis-length to minor-axis-length for detection. Thus, superpixels and their edges provide a means of characterizing shapes of objects in an image and detecting objects with specific shape. Exploiting shape and orientation of these superpixels also enables detection of long, thin superpixels, which can find roads, walls and other long, thin structures.

As mentioned, the boundary classifier component 180 can identify whether an edge is an internal or external edge by comparing the contrast between respective values (e.g., statistical values $SM_1$, $SM_2$, $SM_n$) of superpixels that share a boundary. An internal edge can be formed by two superpixels which represent the same object. An external edge can be formed by a first superpixel that represents a first object and a second superpixel that represents a second object. For readability, both man-made features and natural features are referred to herein as objects, wherein man-made objects can include a building(s), a road(s), a track(s), a vehicle(s), etc., while a natural feature can include a grassy area (e.g., a field), other vegetation such as trees/bushes, a water feature (e.g., a pond, a lake, a river, etc.), a desert region, etc. Hence an internal edge may be determined between two superpixels which in combination represent an object (or portion thereof) forming a natural feature, while an external edge may be determined between a first superpixel forming a part of a building and a second superpixel representing a grassed region.

Comparison of respective ratio-contrast values can be based upon a threshold value, T. For example, respective edge pixels in boundary 250 have been respectively assigned ID's $210_n$:$210_5$ wherein superpixels $210_5$ and $210_n$ have statistical values similar to each other and similar to $SM_1$. Hence, computing the ratio-contrast measure with similar statistical values yields a ratio-contrast measure value close to 0. Accordingly, both sets of edge pixels between first superpixel $210_5$ and second superpixel $220_n$ are assigned the corresponding ratio-contrast measure. Owing to the statistical measures having the same value or similar value, the contrast-ratio does not exceed the threshold value T and the boundary 250 is determined, by the boundary classifier component 180, to be an edge/boundary that is consistent with being internal to an object which includes superpixels $210_5$ and $210_n$. In another example, respective edge pixels forming boundary 260 has been respectively assigned ID's $220_4$:$220_3$, wherein superpixels $220_3$ and $220_4$ have statistical values similar to each other and similar to $SM_2$. Hence, computing the ratio-contrast measure with similar statistical values yields a ratio-contrast measure value close to 0. Accordingly, both sets of edge pixels between first superpixel $220_3$ and second superpixel $220_4$ are assigned the corresponding ratio-contrast measure. Owing to the statistical measures being of similar value, the ratio-contrast threshold value T is not exceeded and the boundary 260 is determined, by the boundary classifier component 180, to be an edge/boundary that is consistent with being internal to an object which includes superpixels $220_3$ and $220_4$.

In a further example, boundary 270 is formed from a first superpixel $210_1$ having a statistical value of $SM_1$. Boundary 270 is further formed from a second superpixel $220_1$ having a statistical value of $SM_2$. Hence, computing the ratio-contrast measure with disparate statistical values yields a ratio-contrast measure that is close to 1. Accordingly, both sets of edge pixels between first superpixel $210_1$ and second superpixel $220_1$ are assigned the corresponding ratio-contrast measure. Owing to the statistical measures $SM_1$ and $SM_2$ having different values, the ratio-contrast threshold value T is exceeded and the boundary 270 is determined, by the boundary classifier component 180, to be an edge/boundary that is consistent with being external to an object formed by either of superpixels $210_1$ or $220_1$. While an approach of threshold comparison is presented to determine a contrast between a first superpixel and a second superpixel, any other suitable method for making such a determination can be applied to the one or more embodiments presented herein.

Returning to FIG. 1, per the foregoing, a plurality of sub-images can be generated to enable assignment of the various statistics relating to the respective edge pixels, and further to enable determination of element-by-element ratios and final construction of the boundary detected image 188. For example, respective superpixel statistics are stored in a first sub-image 183 and a second sub-image 184. For every edge of every first superpixel within the first sub-image 183, the first statistic of the first superpixel is stored. For every edge of every first superpixel in the second image 184, the second statistic of the second superpixel is stored. A third sub-image 185 is generated by computing the element-by-element ratio of the first sub-image 183 to the second sub-image 184, which corresponds to $SM_j/SM_k$, per Eqn. 1, above. A fourth sub-image 186 is generated by computing the element-by-element ratio of the second sub-image 184 to the first sub-image 183, which corresponds to $SM_k/SM_j$, per Eqn. 1. Accordingly, the third sub-image 185 and the fourth sub-image 186 have valid values at the edge locations only, any off-edge locations contain invalid data. A fifth image (e.g., another sub-image (not shown) or an iteration of the boundary detected image 188) is created by generating an element-by-element minimum between corresponding pixels of the third sub-image 185 and the fourth sub-image 186, which corresponds to $$\min\left(\frac{SM_j}{SM_k}, \frac{SM_k}{SM_j}\right)$$

in Eqn. 1. Every element of the fifth image is multiplied by a constant of −1 and a constant of 1 is added, which completes the computation of the ratio contrast measure presented in Eqn. 1, above.

In an embodiment, the boundary detected image 188 can be utilized as an input into a segmentation component 189, wherein the segmentation component 189 can be utilized to segment (divide) a radar image into large regions that correspond to objects in the radar image, wherein the large regions are typically larger than the superpixels which are generated by the superpixel segmentation component 170.

The memory 152 further comprises a classifier component 190. Owing to each SAR image in the registered stack 149 is segmented, the classifier component 190 can assign at least one label to the at least one superpixel based upon a vector of pixel values, wherein a number of entries in the vector maps to a number of images in the stack 149. Pursuant to an example, the classifier component 190 can be configured to determine if a superpixel represents a particular type of vegetation based upon pixel values in the superpixel. When the classifier component 190 determines that the superpixel represents the particular type of vegetation, the classifier component 190 can assign a label to the superpixel in the boundary detected image 188 that indicates that the superpixel represents the particular type of vegetation. It can be ascertained that the classifier component 190 can be configured to perform a classification based upon pixel values of a superpixel with respect to any suitable object, feature, or the like. For example, the classifier component 190 can be configured to determine whether a superpixel represents a body of water, a particular type of road surface, a ditch, etc. Accordingly, as a function of the classifier component 190 operating in conjunction with the boundary detector component 180, a classified image 195 can be generated. In an embodiment, superpixels included in the image 195 which have a low coherence may be classified as a natural feature, while superpixels having a high coherence may be classified as a man-made object, and further the respective internal (e.g., edges 250, 260) and external edges (e.g., edge 270) of the man-made structure or natural feature can be identified to facilitate automation of object recognition in a SAR image.

The classifier component 190 can be trained to perform a classification based upon labeled training data. For example, analyst(s) can manually identify superpixel/segments of SAR images that represent an object, feature, or the like that is to be classified. Likewise, negative training data can be considered, where analyst(s) manually identify superpixels of SAR images that do not represent the object, feature, or the like that is to be classified. Features of a superpixel that can impact whether the superpixel represents an object include, but are not limited to, size of the superpixel, shape of the superpixel, average intensity values of pixels in the superpixel, distribution of intensity values of pixels in the superpixel, etc. These features can be (inherently) identified when training the classifier component 190, and the classifier component 190 can perform suitable computations with respect to pixel values in the superpixel when classifying the superpixel as representing an object or feature or not representing the object or feature.

When applied to image regions with little spatial variation, such as roads and deserts, SLIC can create superpixels that are fairly uniform and compact. When applied to image regions with coarse textures, such as a tree canopy, SLIC produces superpixels with higher spatial frequency variations. It is possible to exploit these superpixel shape characteristics by computing shape and texture statistics of superpixel edges to characterize coarse image textures. Computing the ratio of circumference to area for each superpixel can yield a compactness measure of the superpixels, which is related to the texture of the underlying SAR image. Other possible measures of local texture include local variance of superpixel size, local variance of superpixel circumference and local variance of edge contrasts. The classifier component 190 can be configured to take into account such considerations when classifying one or more objects in a classified image 195.

It is to be appreciated that while the preceding has described oversegmenting an artifact-reduced SAR image product 165 to form a superpixel image product 175 and subsequently determining internal/external edges formed therein, the superpixel image product 175 can also be directly applied to any of the registered SAR images (e.g., registered SAR images 146-148). For example, the superpixel image product 175 can be registered with the SAR images in the stack 149, and the superpixel segmentation component 170 can apply the boundaries 177 of the superpixels 176 of the superpixel image product 175 to all registered SAR images 146, 147, and 148 in the stack 149. In an example, the superpixel segmentation component 170 can apply the superpixels to the registered SAR image 146 (and thus to the original SAR image 143), thereby creating a segmented registered SAR image 195. The segmented registered SAR image 195 has a plurality of superpixels 197, bounded by boundaries 198, that respectively correspond to the segments 176 (and boundaries 177) in the superpixel image product 175. Each segment in the segmented registered SAR image 197 comprises a respective plurality of pixels, which have values corresponding thereto. As noted above, however, as the superpixel image product 175 is registered with SAR images in the stack 149, the segments of the superpixel image product 175 can be applied to others of the registered SAR images in the stack 149. Thus, the registered SAR images in the stack 149 can each be segmented in accordance with the boundaries of the superpixels.

As previously mentioned, for each superpixel, the member pixel locations of each superpixel can be indexed into a co-registered image product, (such as MRCS or MCCD). Superpixel statistics can be computed from the respective intensities of the image products, where such statistics can include mean, median and/or coefficient of variation. The superpixel segmentation component 170 can generate one or more segmented SAR images 175 utilizing the superpixel statistic(s), wherein each superpixel is filled with its corresponding estimated statistic. The superpixel segmentation component 170 can utilize various algorithms to generate an oversegmented SAR image 175. In an embodiment, per Eqns. 2-5 below, the sample mean $\mu_j$, median $m_j$, and coefficient of variation $\gamma_j$ for a superpixel j, can be respectively calculated for each superpixel. A set $\Omega_j$ contains member pixels belonging to superpixel j, where $N_j$ is the number of pixels in the set and each pixel i has intensity $I_i$. The set $\Theta_j$ contains intensities of member pixels, ordered by increasing intensity.

$$\mu_j = \frac{1}{N_j} \sum_{i \in \Omega_j} I_i \tag{2}$$

$$m_j = [\Theta_j]_{\frac{N_j+1}{2}} \tag{3}$$

$$\sigma_j = \sqrt{\frac{1}{N_j - 1} \sum_{i \in \Omega_j} (I_i - \mu_i)^2} \tag{4}$$

$$\gamma_j = \frac{\sigma_j}{\mu_j} \tag{5}$$

As previously mentioned, edge pixels are found for each superpixel. The superpixel label image (e.g., superpixel label image 300) is shifted up, down, left and right with respect to itself, locations where the labels of a first pixel overlaid with a second (formerly adjacent) pixel do not match are identified, which correspond to the edges of each superpixel that border another superpixel.

An edge-label image can then be created where each edge pixel contains the neighboring superpixel ID. From the edge-label image an edge-statistic image can be created, wherein each edge pixel contains the neighboring superpixel statistic.

A plurality of approaches/algorithms can be utilized by the boundary classifier component 180 to generate contrast statistics for an edge. One approach entails the boundary classifier component 180 computing three contrast statistics for each edge, which are derived from the following edge detectors: a "ratio edge detector", a "cross-correlation edge detector", a "fused edge detector". As previously mentioned, an external edge and/or an internal edge can be determined based upon a contrast between the edge pixel(s) of a first superpixel and the edge pixel(s) of a second superpixel located at a superpixel boundary.

A "ratio edge detector" takes a mean $\mu_j$ of superpixel j (e.g., a first superpixel) and the mean, $\mu_k$, of a neighboring superpixel k (e.g., a second superpixel), and, per Eqn. 1 above, computes the ratio edge detector.

As previously mentioned, the ratio edge detector, $r_{jk}$, enables a contrast between neighboring superpixels to be determined. The ratio edge detector $r_{jk}$ can discount multiplicative contamination, which renders it useful for SAR images which contain speckle. For additive noise, especially Gaussian noise, a ratio edge detector based on Euclidean distance $d_{jk} = \|\mu_j - \mu_k\|$ can be utilized, however, it but lacks the property that it is constrained between 0 and 1.

A "cross-correlation edge detector" can be utilized for each superpixel, j, and neighboring superpixel, k, and utilizes the number of pixels, $n_j$ and $n_k$ in each respective superpixel, respective means, and $\mu_j$ and $\mu_k$, respective standard deviations, $\sigma_j$ and $\sigma_k$, respective variation coefficients, $\gamma_j = \sigma_j / \mu_j$ and $\gamma_k = \sigma_k / \mu_k$, a contrast estimate, $\bar{c}_{jk} = \mu_j / \mu_k$, and computes, per Eqn. 6, a cross-correlation coefficient:

$$\rho_{jk} = \sqrt{\frac{1}{1 + (n_j + n_k) \frac{n_j \gamma_j^2 \bar{c}_{jk}^2 + n_k \gamma_k^2}{n_j n_k (\bar{c}_{jk} - 1)^2}}} \tag{6}$$

The cross-correlation coefficient, $\rho_{jk}$, can account for mean contrast as well as homogeneity of each superpixel region.

A "fused edge detector" enables computation of an associative symmetrical sum, $\xi_{jk}$, of the ratio edge detector, $r_{jk}$, and the cross-correlation edge detector, $\rho_{jk}$, per Eqn. 7:

$$\xi_{jk} = \frac{r_{jk}\rho_{jk}}{1 - r_{jk} - \rho_{jk} + 2r_{jk}\rho_{jk}} \quad (7)$$

As previously mentioned, the computed contrast value(s) can be compared against a threshold, T. In response to the boundary classifier component 180 determining that the computed contrast value(s) is less than the threshold, T, the boundary classifier component 180 can determine that the respective contrasts for the first superpixel and the second superpixel are similar, accordingly the first superpixel and the second superpixel represent part or all of the same structure and the edge is an internal edge. Alternatively, in response to the boundary classifier component 180 determining that the computed contrast value(s) matches or exceeds than the threshold, T, the boundary classifier component 180 can determine that the respective contrasts for the first superpixel and the second superpixel are not similar, the first superpixel represents part or all of a first object and the second superpixel represents part or all of a second object, and the edge is an external edge. Thus, for example, owing to the difference in contrasts exceeding T, the first object could be a man-made structure, while the second object is a natural feature captured in the SAR image.

In an alternative approach, rather than the previously described threshold approach, the boundary classifier component 180 can utilize the ratio-based contrast values to compute pairwise edge potentials for a conditional random field (CRF). The CRF utilizes the contrast values to find spatial groupings of similar superpixels, which form larger segments that correspond to scene-relevant regions with similar backscatter or optical properties. The divisions between the segments become the detected edges, e.g., external edges and internal edges.

Further, alternate representations of superpixels and their edges can be utilized. To perform logical operations on superpixels and edges, storing superpixel ID numbers, neighboring ID numbers and neighbor statistics in image arrays maintains spatial relationships and can speed computation times. Alternatively, storing superpixel data in Matlab cell arrays or arrays of linked lists facilitates application of graph-based algorithms, such as conditional random fields. Finally, sparse arrays provide memory efficient indexing to access relationships between neighboring superpixels and their statistics.

Furthermore, the boundary classifier component 180 can utilize an alternative method for extracting boundaries of man-made structures from superpixel segmentations dependent upon computing superpixels from a number of different speckle-reduced image products, such as MRCS, MCCD, and SA-ML. The edges that correspond to solid structures in the image will be replicated in every set of superpixels. Combining the segmentations together can reinforce the persistent boundaries that correspond to man-made structure boundaries.

It is to be understood that artifacts in the SAR image 143 would impact oversegmentation of the registered SAR image 143 if the superpixel segmentation component 170 were configured to directly oversegment the SAR image 143. Thus, the superpixels 176 in the segmented SAR image 175 are different from superpixels that would be generated from directly oversegmenting the SAR image 143. When the artifact reduction component 160 generates the artifact-reduced SAR image product 165 based upon the registered SAR image 146, however, resolution of at least one dimension in the artifact-reduced SAR image product 165 may be less than resolution of the SAR image 143. Accordingly, reducing artifacts in the registered SAR image 146 prior to oversegmenting is non-intuitive, as it may be expected that oversegmenting a lower resolution SAR image product may negatively impact classification performed based upon the segmented image product. In addition, the artifact-reduced SAR image product 165 utilized to generate the superpixels can be based on multiple SAR image products, which can be derived from different SAR backscatter phenomena. The superpixel segmentation component 170 facilitates the ability to generate the SAR image superpixels 176 from a particular SAR backscatter phenomenon and apply those superpixels to images or image products that exhibit an alternate SAR backscatter phenomenon. For example, an MCCD image product can capture a man-made structure with a high degree of accuracy, and accordingly superpixels generated based upon the MCCD image product (e.g., MCCD 167) can be applied to a radar cross section image product, which includes characteristic distributions of pixel intensities for different surfaces but may include less well-defined edges for man-made structures.

Returning to the exemplary speckle reduction operations which can be performed by the artifact reduction component 160, the following provides an overview of SA-ML 166, MCCD 167, and MRCS 168 techniques, which can be utilized by the artifact reduction component 160 when generating the artifact-reduced SAR image product 165.

Figure 4:
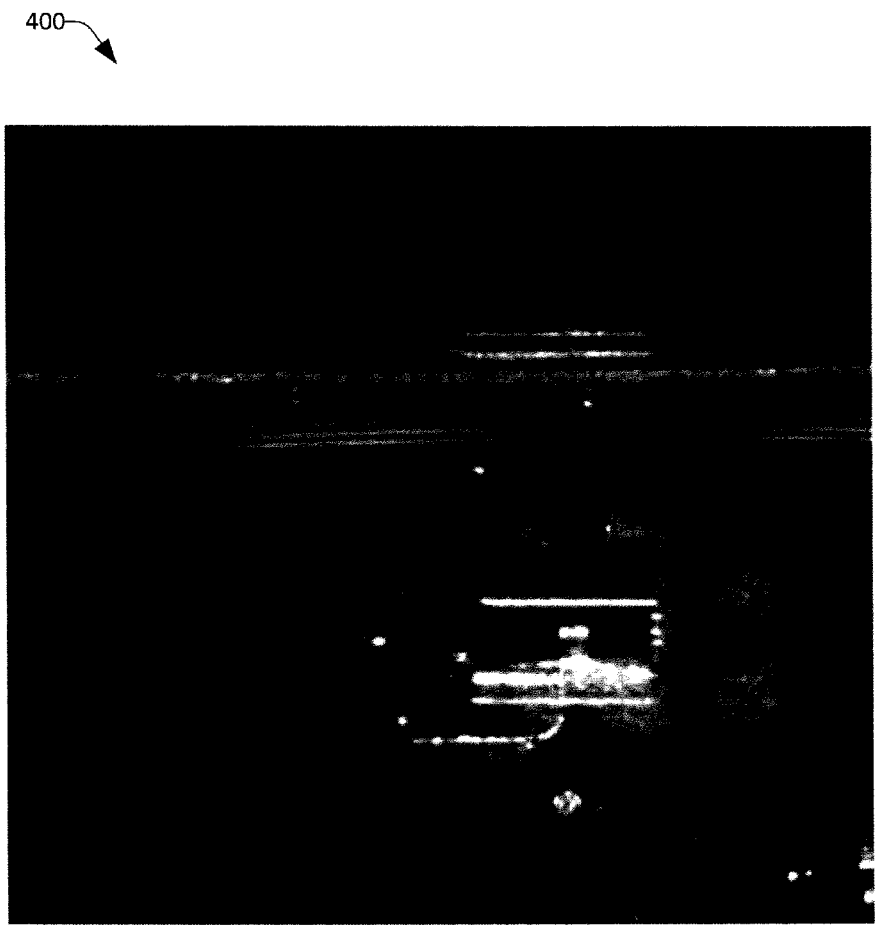
FIG. 4 presents an exemplary subaperture multilook (SA-ML) image product.

Forming a SA-ML image product can require transforming a complex-valued SAR image (e.g., registered SAR image 146) back to the two-dimensional Fourier domain, partitioning the spectrum into non-overlapping pieces, and non-coherently averaging the images formed from each piece of the spectrum. As mentioned above, a SA-ML image product can have a coarser spatial resolution than an SAR backscatter magnitude image formed from the complete phase history, but also has reduced speckle. FIG. 4 presents an example of an SA-ML image product 400 which can be formed by application of the SA-ML imaging algorithm 166 to a SAR image (e.g., registered SAR image 146). The SA-ML image product 400 can be calibrated, and the log-magnitude computed, prior to the superpixel segmentation component 170 segmenting the artifact-reduced SAR image product 165 (which is based upon the SA-ML image product 400). For example, the SA-ML image product 400 can be a $20 \log_{10}$ (SA-ML).

Figure 5:
FIG. 5 presents an exemplary median-over-time of radar cross section (MRCS) image product.

A MRCS image product can be formed by utilizing SAR images generated based upon multiple passes over the same scene (e.g., scene 115). Thus, the artifact reduction component 160 receives multiple SAR images (e.g., from the registered images 146-148) that are based upon SAR data generated from different passes over the scene, and utilizes the MRCS algorithm 168 to estimate image statistics for speckle reduction. The MRCS algorithm 168 can form a stack of co-registered Radar Cross Section (RCS) images of the same scene 115 and can compute a pixel-by-pixel median image product to form the MRCS image product, which is a temporal multilook product. The artifact reduction component 160 can compute the log-magnitude of the MRCS image product prior to the superpixel segmentation component 170 segmenting the artifact-reduced SAR image product 165, wherein the artifact-reduced SAR image product 165 can be based upon the MRCS image product. In an exemplary embodiment, a MRCS image product can refer to $20 \log_{10}$ (MRCS). FIG. 5 shows an example of an MRCS image product 500.

A complex-valued radar backscatter (BKS) image can provide not only magnitude of the backscattered radar return, but also a phase of the returned signal (e.g., return signal 124), which can be utilized for determining coherence between multiple passes and for forming interferometric height maps.

CCD image products, produced from co-registered images (e.g., registered SAR images 146-148) of the same scene 115 collected at different times (e.g., formed from co-registering SAR images 141-143), can exploit the phase information in the backscatter signal 124 to detect subtle changes such as tire tracks in a dirt road or breeze-induced shifts in vegetation. Collecting a large number of passes (e.g., 25 passes or more) from the same scene 115 enables characterization of patterns of change over time. The artifact reduction component 160 can utilize the MCCD algorithm 168 to generate CCD image products from pairs of images in the registered SAR images 146-148, and further average a plurality of CCD image products together to create a MCCD image product. The MCCD image product represents the average change for different structures/terrains. For example, even a field of windblown grass can produce a smooth MCCD if the change from day to day is consistent.

Figure 6:
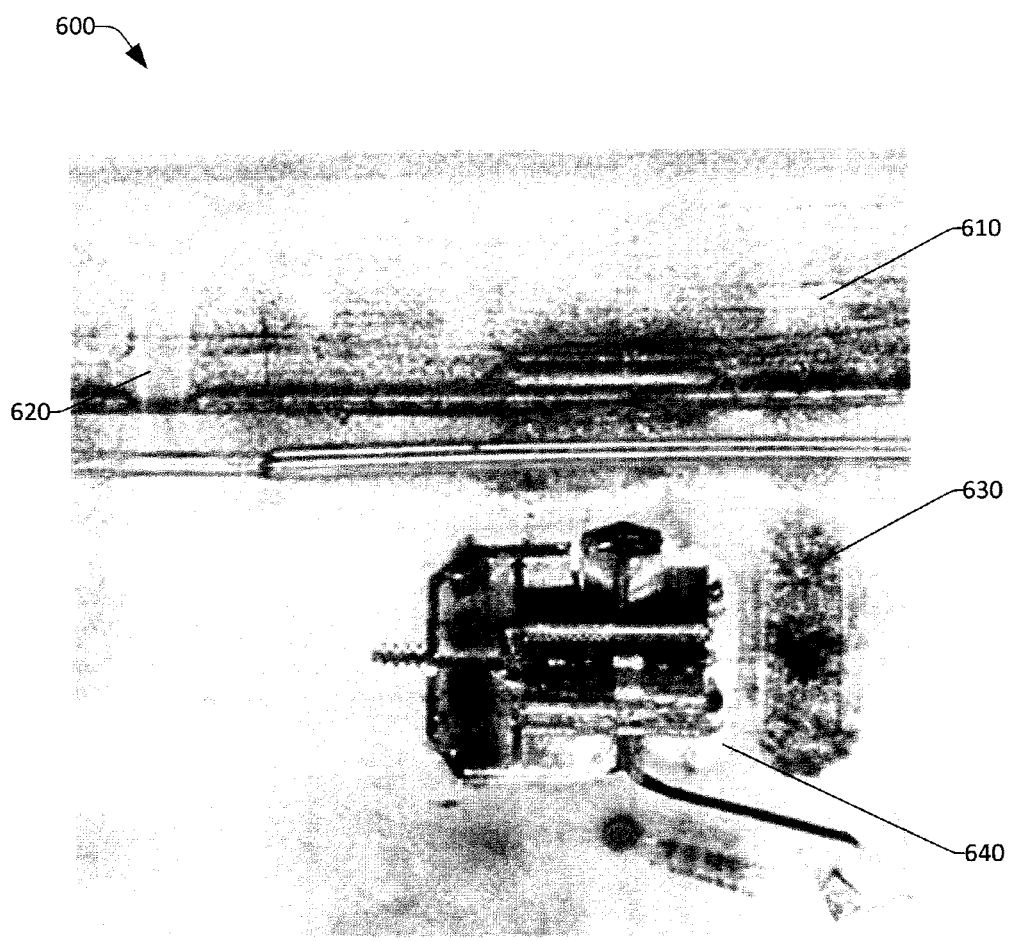
FIG. 6 presents an exemplary mean coherent change detection (CCD) image product.

FIG. 6 shows a MCCD image product formed from an average of 29 CCD image products, where a dark color indicates regions of low average coherence produced by physical scene changes between collection-times of the image pairs, shadows, or regions blocked from the radar signal. The surrounding desert 610 exhibits slightly more change over time than the packed dirt parking lot and driveway 620. The gravel 630 to the right of the building exhibits relatively small change over time whereas the three trees 640 inside the oval planting area have moderate change likely a result of small displacements from wind and weather. A criterion for creating superpixels can be that structures made of the same material have similar change properties over time. The MCCD image product represents structures in the image in slightly different ways than do the products based on backscatter magnitude. Some structures are more prominent and others are less so. Because different surface materials exhibit characteristic mean coherent changes over time, the superpixel segmentation component 170 can use MCCD to delineate segments of similar surface type, and the classifier component 190 can exploit MCCD to classify surface types.

In an embodiment, the artifact reduction component 160 can utilize one or more of the speckle reduction techniques SA-ML 166, MCCD 167, MRCS 168, (and optionally other techniques) to form the artifact-reduced SAR image product 165. For example, the artifact-reduced SAR image product 165 can be based upon the three techniques mentioned above, such that each pixel in the artifact-reduced SAR image product 165 has a three-dimensional vector assigned thereto, where the artifact-reduced SAR image product 165 has a resolution of the SA-ML image product. Thus, as noted above, a value of a first dimension for a pixel can be based upon an SA-ML image product (generated by the artifact reduction component 160 through use of the SA-ML 166 technique), a value of a second dimension for the pixel can be based upon an MRCS image product (generated by the artifact reduction component 160 through use of the MRCS 168 technique), and a value of a third dimension for the pixel can be based upon an MCCD image product (generated by the artifact reduction component 160 through use of the MCCD technique 167). The pixel can also have range and azimuth dimensions assigned thereto. Accordingly, the artifact reduction component 160 can generate the artifact-reduced image product 165 such that each pixel has values for an n-dimensional vector assigned thereto, where n is a positive integer.

As previously mentioned, the superpixel segmentation component 170 can oversegment the artifact-reduced SAR image product 165 based upon values of the n-dimensional vector for each pixel in the artifact-reduced SAR image product 165. For example, the superpixel segmentation component 170 can employ a distance-based technique when segmenting the artifact-reduced SAR image product 165, such as the QUICK-SHIFT algorithm. Execution of the QUICK-SHIFT algorithm over the artifact-reduced SAR image product 165 causes the artifact-reduced SAR image product 165 to be segmented into superpixels, where each superpixel in the superpixels represents a region of the artifact-reduced SAR image product 165 that comprises pixels having similar intensities in close spatial proximity.

The QUICK-SHIFT algorithm forms a Parzen density estimate of spatial and intensity distance relationships between neighboring pixels in the artifact-reduced SAR image product 165. The distance between pixels i and j, as shown in Eqn. 8, accounts for both difference in intensity and difference in spatial proximity between the two pixels. Per Eqn. 8, $r_i$ is the row index, $c_i$ is the column index and $I_i$ is the intensity of pixel i:

$$d_{ij}^2 = (r_i - r_j)^2 + (c_i - c_j)^2 + (I_i - I_j)^2 \qquad (8)$$

Eqn. 9 shows the local Parzen density estimate for a pixel i over a neighborhood $N_W$, where $\sigma$ is the Gaussian window width and W is the search window width.

$$p_i = \Sigma_{j \in N_w} e^{-d_{ij}^2 / 2\sigma^2} \qquad (9)$$

Figure 7A:
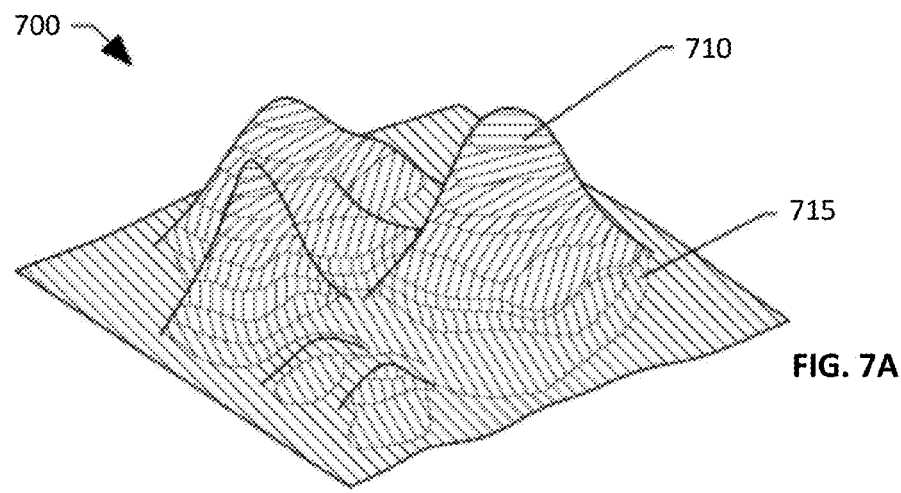
FIG. 7A presents an exemplary diagram of Parzen density estimate of spatial-intensity distance.

The Parzen density estimate produces larger values for pixels whose close neighbors have similar intensities. FIG. 7A presents a conceptual representation of the Parzen density over the row and column grid space comprising a plurality of high intensity regions 710 and lower intensity regions 715.

Figure 7B:
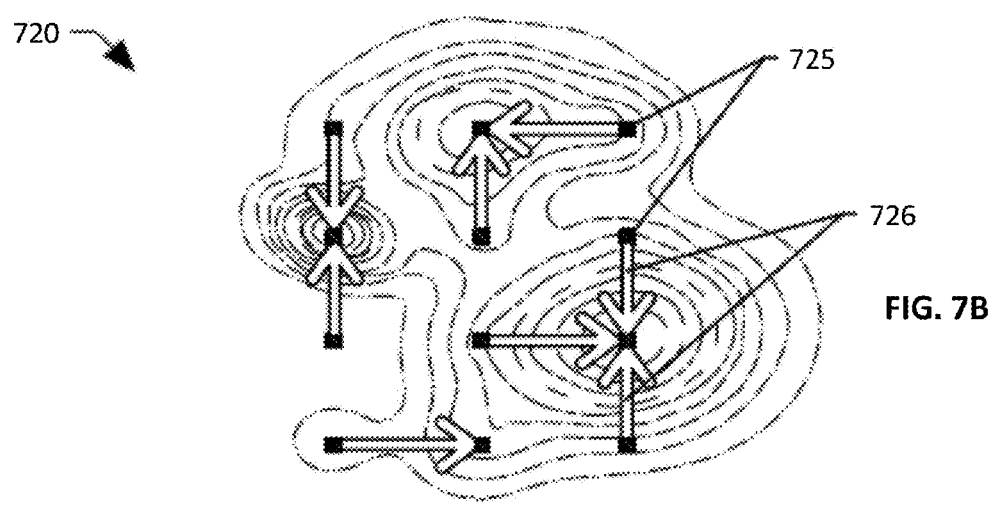
FIG. 7B presents an exemplary diagram of local search for higher-density, minimum-distance parent.
Figure 7C:
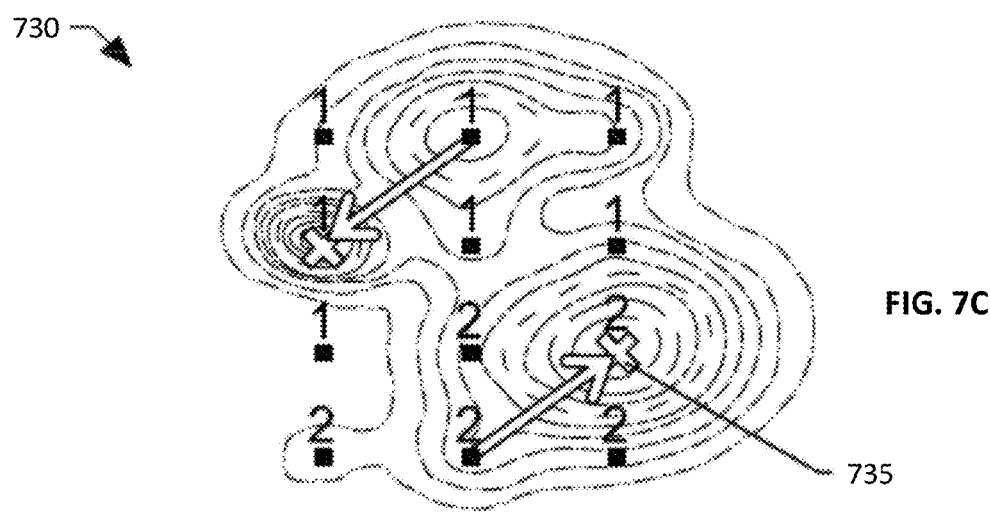
FIG. 7C presents an exemplary diagram of local search for parent-of-parent.

In contrast to gradient search algorithms, which iteratively compute gradients in the direction of a local maximum, a QUICK-SHIFT technique constrains its search to pass through image pixels. For each pixel in the artifact-reduced product 165, QUICK-SHIFT searches a local region to find a "parent" pixel, one that has higher density than itself and closest distance within the search region. FIG. 7B, image 720, illustrates Parzen density contours with dots 725 that indicate the locations of image data pixels. The arrows 726 respectively indicate the association between each pixel, at the tail, and its parent, at the head. Some pixels are self-parents with no tails because they represent local density maxima. Then, each pixel follows parents-of-parents, creating a chain of associations, until it reaches a parent with largest local density. FIG. 7C depicts an example of this second search step, which finds two parent-of-parent pixels indicated by boldface x's, 735. All pixels associated with each local maximum form the corresponding superpixel, where pixels labeled with "1" correspond to one local maximum and pixels labeled with "2" correspond to the other local maximum. By searching for local parent pixels with higher density, QUICK-SHIFT avoids computationally expensive gradient calculations, but still achieves a constrained locally optimal solution. Computational complexity of QUICK-SHIFT is $O(N^2)$.

The SLIC algorithm implements a localized k-means algorithm with a distance metric that depends on both spatial and intensity differences. The Euclidean spatial distance between pixels i and j is provided in Eqn. 10:

$$d_{sij} = \sqrt{(r_i - r_j)^2 + (c_i - c_j)^2} \qquad (10)$$

Euclidean intensity distance for 3-channel intensities with weighting factors is provided in Eqn. 11:

$$d_{Iij} = \sqrt{w_1 (I_{1i} - I_{1j})^2 + w_2 (I_{2i} - I_{2j})^2 + w_3 (I_{3i} - I_{3j})^2} \qquad (11)$$

In an example, $w_1 = w_2 = w_3 = 1$, although other values are possible, and more or fewer dimensions are contemplated. In an embodiment, per the foregoing, any combination of SA-ML 166 image product, the MCCD 167 image product, and/ or the MRCS 168 image product can be selected by the superpixel segmentation component 170 as one, two, or three input channels for SLIC segmentation. The input channels can be scaled to similar magnitude ranges with equal weightings. If a particular channel(s) (e.g., any of the SA-ML 166 image product, the MCCD 167 image product, and/or the MRCS 168 image product) is deemed to be more important than another(s), the weightings can be adjusted accordingly. Further, the channel inputs can be weighted to scale a parameter (e.g., amplitude) to a similar range(s). When applying SLIC to either SA-ML or MRCS products, log-magnitude can be first computed. Applying the Euclidean distance in the log-magnitude domain is equivalent to a ratio-intensity distance in the magnitude domain.

As previously mentioned, an n-dimensional vector can also be generated with one of the input channels utilizing IF-H map data. To avoid IF-H map data dominating a superpixel segmentation operation, a weight can be assigned to the IF-H input channel (e.g., a weighting that is eight times smaller than applied to the other product input channels). MLIF indicates a combination of SA-ML and IF-H product inputs, and MLMCIF indicates a combination of SA-ML, MCCD and IF-H product inputs.

Eqn. 12 illustrates how a SLIC-based technique combines spatial and intensity distances together to create its distance measure, which depends on a compactness parameter, m, and an initial superpixel grid spacing parameter, S, where $S=\sqrt{N/k}$, where N is a number of pixels in the artifact-reduced product 165 and k is an initial number of superpixels:

$$D_{ij} = d_{Iij} + \frac{m}{s} d_{sij} \quad (12)$$

Figure 8A:
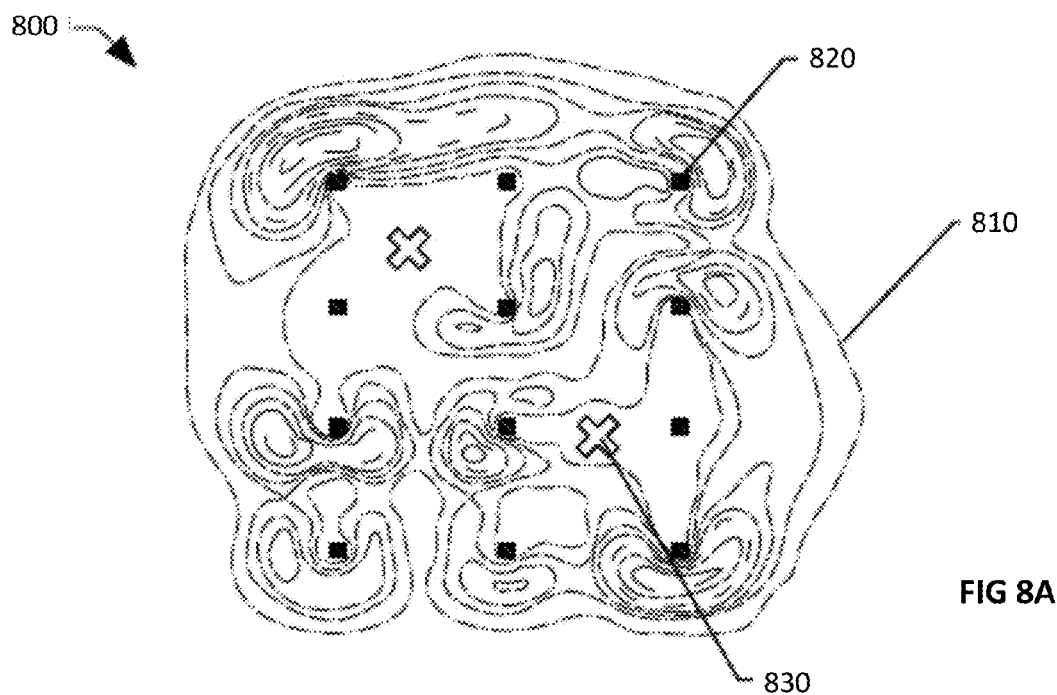
FIG. 8A presents an exemplary diagram of intensity gradient with initial cluster centers located at local minima.
Figure 8B:
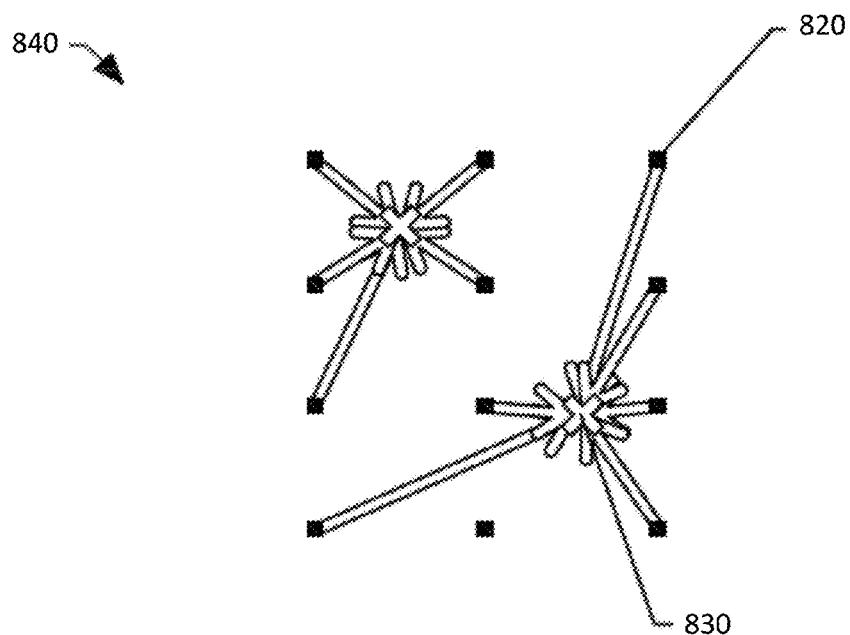
FIG. 8B presents an exemplary diagram of finding a closest local cluster center in local k-means.

Because, the k-means algorithm can produce different cluster results with different cluster center initializations, SLIC-based technique deterministically initializes cluster centers to local minima of the intensity gradient. FIG. 8A, image 800, presents a conceptual representation of intensity gradient contours 810. Dots 820 represent the pixel data locations and boldface x's 830 indicate the initial cluster centers located at two local gradient minima. After initialization, the SLIC-based technique ignores the intensity gradient contours 810. SLIC computes distances between every pixel 820 and every cluster center 830 within a local 2S×2S area. FIG. 8B, image 840, illustrates that, for each pixel 820, SLIC finds the closest local cluster center 830 and assigns the respective pixel 820 to it. The SLIC algorithm iterates between assigning pixels to closest clusters and updating cluster means. The SLIC algorithm iterates until the change in cluster center means falls below a preset threshold. Initializing cluster centers to the local intensity gradient facilitates speedy convergence, as does confining each search to a local area. Computational complexity of SLIC is O(N).

Any suitable values can be utilized for the QUICK-SHIFT techniques and the SLIC-based techniques, wherein selected values can be a compromise between fidelity in representing various features in the scene 115 and sufficient size to provide accurate statistical estimates for later classification and reasonable computational complexity. For example, values of σ=8 and w=10 can be utilized for QUICK-SHIFT techniques. While, for example, values of S=50K, 25K or 10K can be utilized, along with m=10.

Figure 9A:
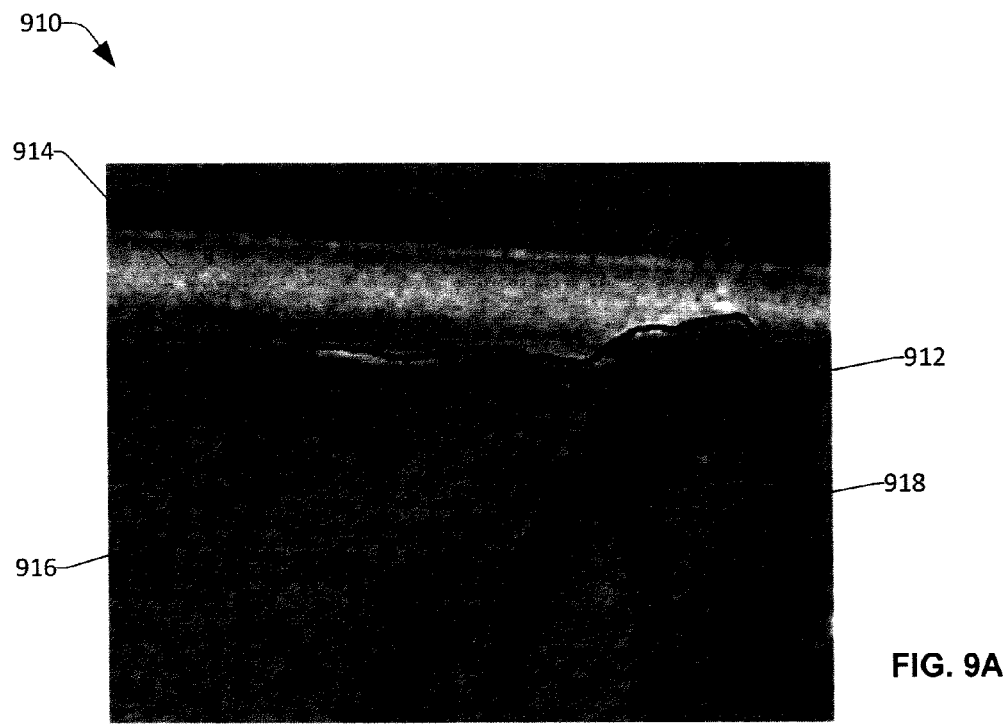
FIG. 9A presents an exemplary MRCS image product including a hand-labeled ground truth.
Figure 9B:
FIG. 9B is a depiction of an exemplary Quick-shift superpixel segmentation process over the MRCS image product shown in FIG. 9A.
Figure 9C:
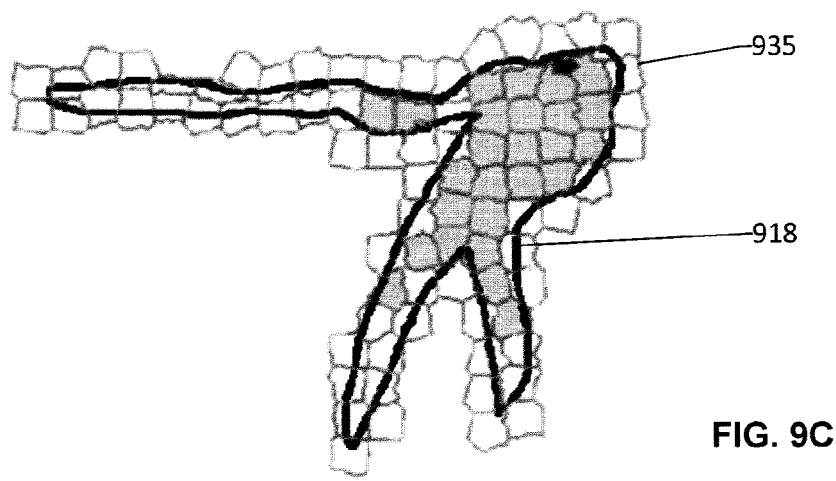
FIG. 9C is a depiction of an exemplary simple linear iterative clustering (SLIC) superpixel segmentation process utilizing a SA-ML image product.

For understanding, FIGS. 9A-9D pertain to analysis of a scene comprising a drainage ditch 912 located between a road 914 and a field 916, wherein, per the MRCS image (FIG. 9A, image 910) the location of the drainage ditch 912 has been outlined by a hand-labelled ground truth 918. FIGS. 9A-9D indicate respective segmentation generated by way of different operations. FIG. 9B, image 920, illustrates superpixels 925 obtained by applying a QUICK-SHIFT-based technique, where σ=8 and w=10. FIG. 9C, image 930, illustrates superpixels 935 obtained by applying a SLIC-based technique, where S=25K and m=10. As shown in FIG. 9C, the SLIC-based technique produces more compact superpixels 935 that conform more readily to the shape of the drainage ditch 912 than the superpixels 925 which are generated via the QUICK-SHIFT-based technique (referenced in FIG. 9B). Further, the superpixels 935 of FIG. 9C are also more uniformly sized, which can be an advantage for making statistical comparisons.

Figure 9D:
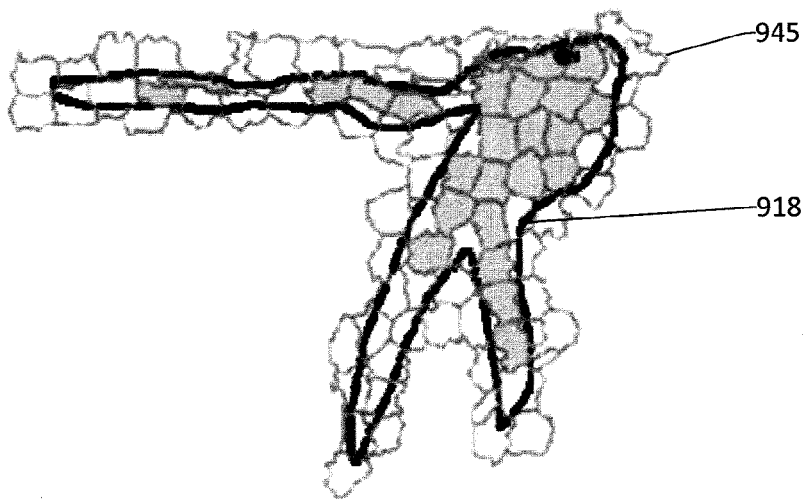
FIG. 9D is an exemplary depiction of a SLIC superpixel segmentation process utilizing a SA-ML image product in conjunction with interferometric height (IF-H) map data.

To correctly map the roadside drainage ditch 912 can be a challenge owing to the drainage ditch 912 having low contrast compared to the background field 916. Accordingly, superpixelation can be improved by including height information into the SPS segmentation. FIG. 9D, image 940, illustrates the resulting superpixels 945 achieved when the artifact-reduced product 165 is based upon both SA-ML and IF-H products, where S=25K and m=10. As shown in FIG. 9D, adding the interferometric height information improves the ability of the superpixels to represent two of the three arms of the drainage ditch 912 when compared with the superpixels 925 and 935 in respective images 9B and 9C.

The artifact reduction component 160 and the superpixel segmentation component 170 can operate in unison to select and utilize one or more of the imaging processes SA-ML imaging 166, MCCD imaging 167, or MRCS imaging 16 (or other suitable data). For example, a product of SA-ML imaging 166 can contain lower spatial frequencies which yield superpixels having smoother edges, which can be advantageous when attempting to represent edges of a man-made structure(s) that may be included in the scene 115. Further, it is possible to utilize SA-ML-derived superpixels to process data from any of the other image products, as long as they are co-registered. For example, if multiple images are not available from the same scene 115 to compute a temporal multi-look MRCS image 168 products, it is possible to create superpixels from an SA-ML image 166 and then apply them to a co-registered MRCS image. In another example, it is possible to compute superpixel histograms from higher resolution MRCS pixels located inside SA-ML superpixels. Such histograms can be useful for classifying surfaces in a SAR image (e.g., any of SAR images 141-143, registered SAR images 146-148, etc.).

Figure 10A:
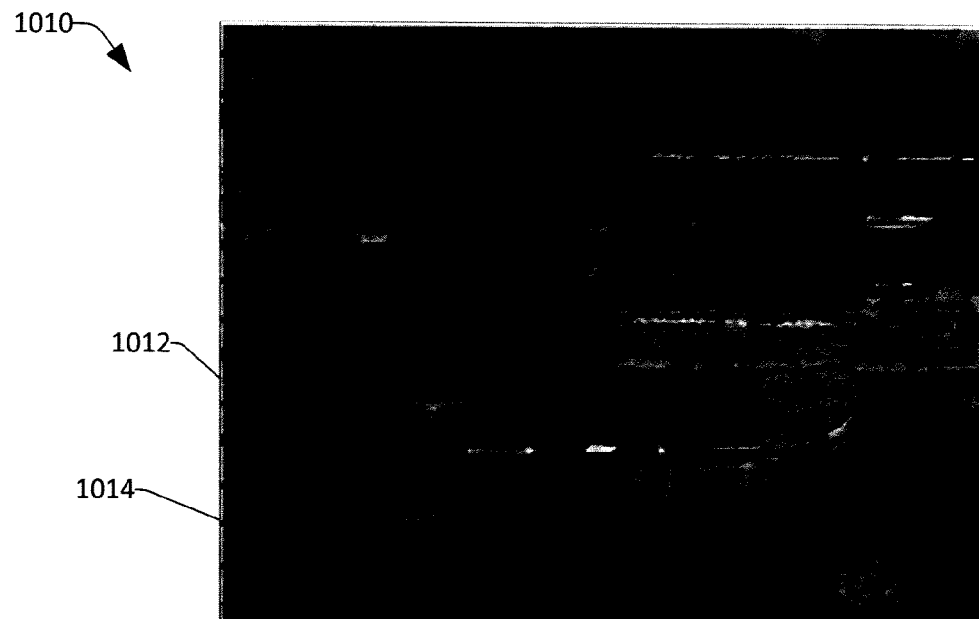
FIG. 10A presents an exemplary image segmentation formed by SLIC based upon an MRCS image product.

FIGS. 10A-10D present respective images for comparison of superpixels derived from different SAR imaging inputs. FIG. 10A presents a SPS image 1010 formed with the superpixel segmentation component 170 utilizing SLIC processing in conjunction with MRCS imaging 168, wherein the SPS image 1010 comprises segments 1012 having respective boundaries 1014, wherein the segments 1012 are formed in conjunction with superpixels in a superpixel image 175.

Figure 10B:
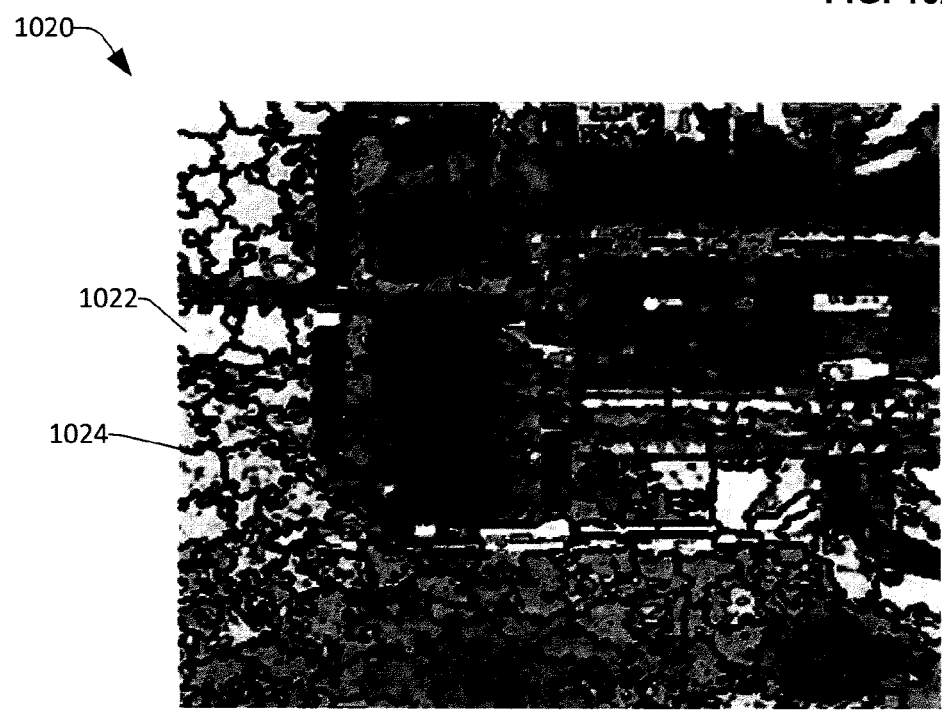
FIG. 10B presents an exemplary image segmentation formed by SLIC based upon an MCCD image product.

FIG. 10B presents a SPS image 1020 formed with the superpixel segmentation component 170 utilizing SLIC processing in conjunction with MCCD imaging 167. Because a MCCD image product represents a different physical phenomenon than RCS-based image products, superpixel segmentation utilizing a MCCD image product can emphasize different structural features. The SPS image product 1020 comprises segments 1022 having respective boundaries 1024. Boundaries 1024 of MCCD-based superpixels 1022 can be contorted to conform to the local variability of the MCCD image product.

Figure 10C:
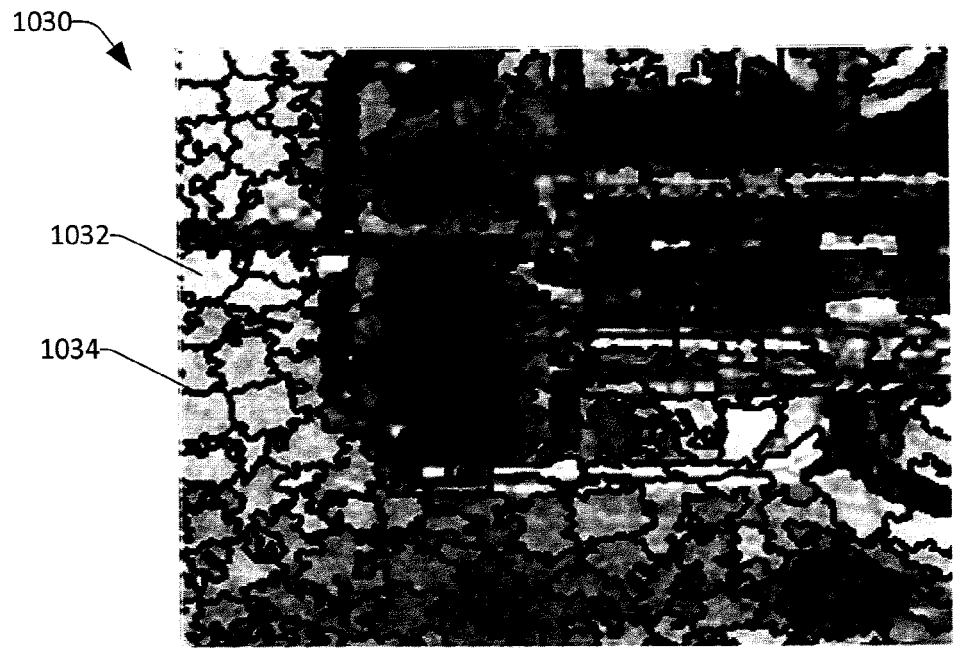
FIG. 10C presents an exemplary image segmentation formed by SLIC based upon SA-ML and MCCD image products.

FIG. 10C presents an SPS image 1030 formed with the superpixel segmentation component 170 utilizing SLIC processing in conjunction with SA-ML imaging 166 combined with MCCD imaging 167 at two channels of the SLIC algorithm. The SPS image 1030 comprises segments 1032 having respective boundaries 1034. The SA-ML image product and the MCCD image product are scaled to similar ranges and equally weighted.

Figure 10D:
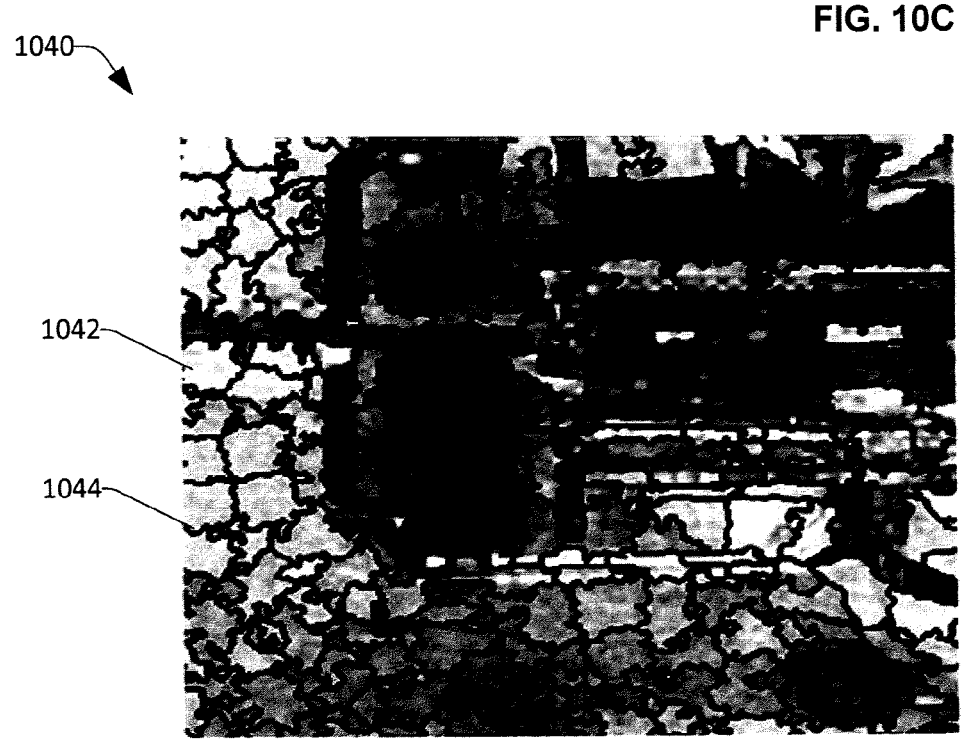
FIG. 10D presents an exemplary image segmentation formed by SLIC based upon a combination of SA-ML, MCCD and IF-H image products.

FIG. 10D presents an SPS image 1040 formed with the superpixel segmentation component 170 utilizing SLIC processing in conjunction with SA-ML imaging 166 combined with MCCD imaging 167 and further IF-H imaging 169 at three channels at the input of SLIC algorithm, wherein the IF-H imaging 169 enables height discrimination (e.g., for the previously mentioned drainage ditch). SPS image 1040 comprises segments 1042 having respective boundaries 1044.

Figure 11:
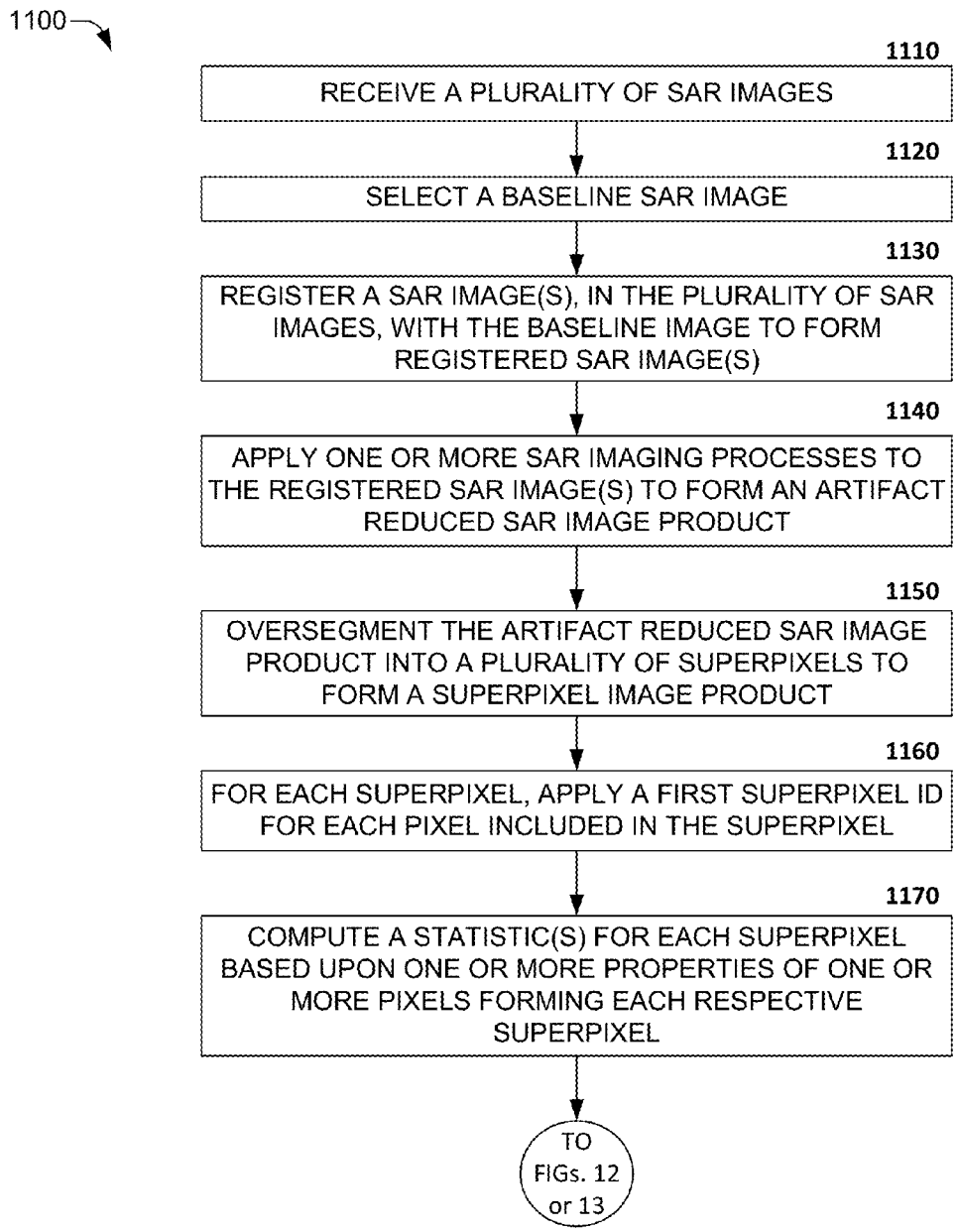
FIG. 11 is a flow diagram illustrating an exemplary methodology for generating a plurality of superpixels in a SAR image, where the SAR image is segmented based upon a speckle-reduced SAR image product.
Figure 12:
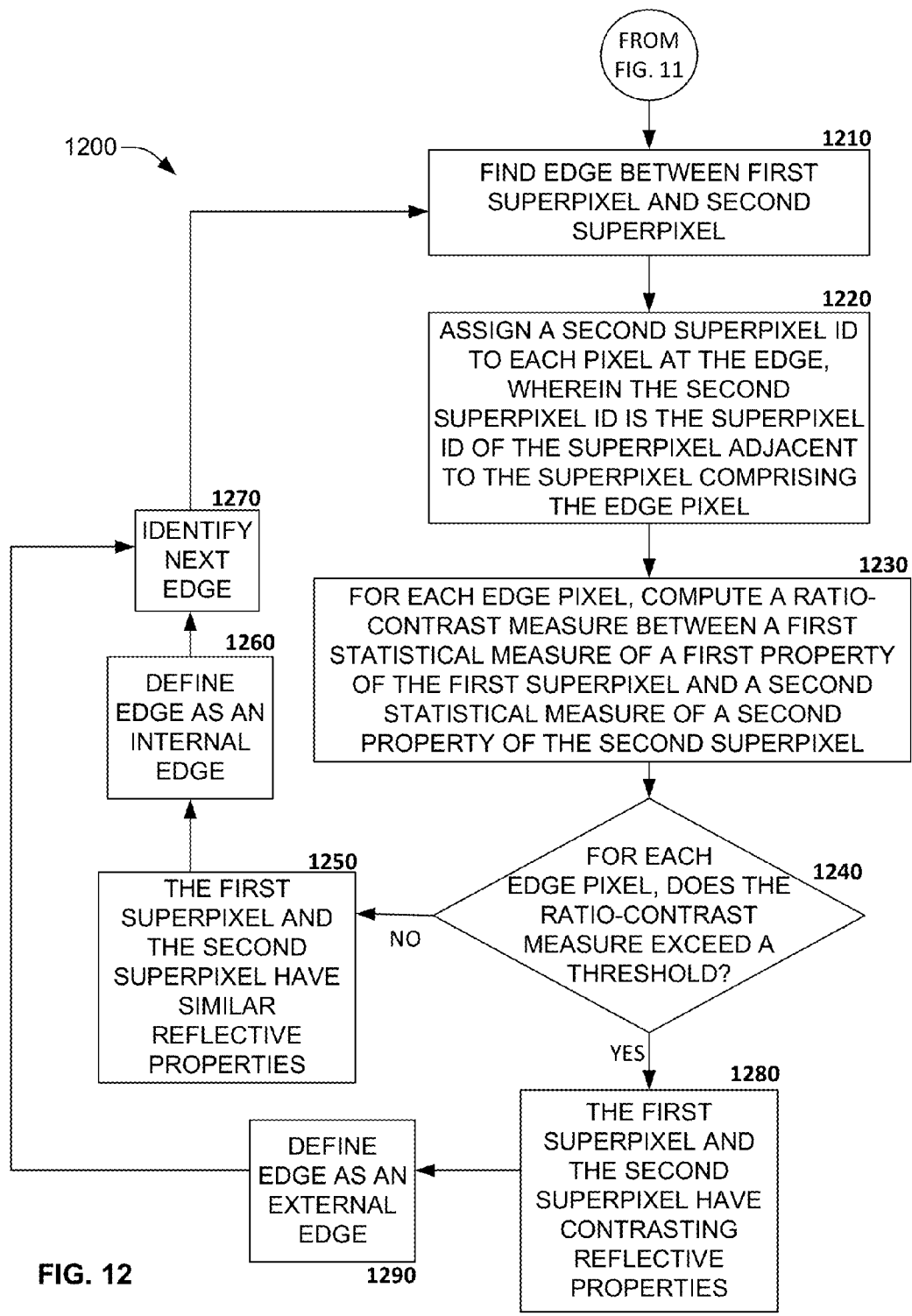
FIG. 12 is a flow diagram illustrating an exemplary methodology for determining whether an edge is an internal edge or an external edge in a SAR image.
Figure 13:
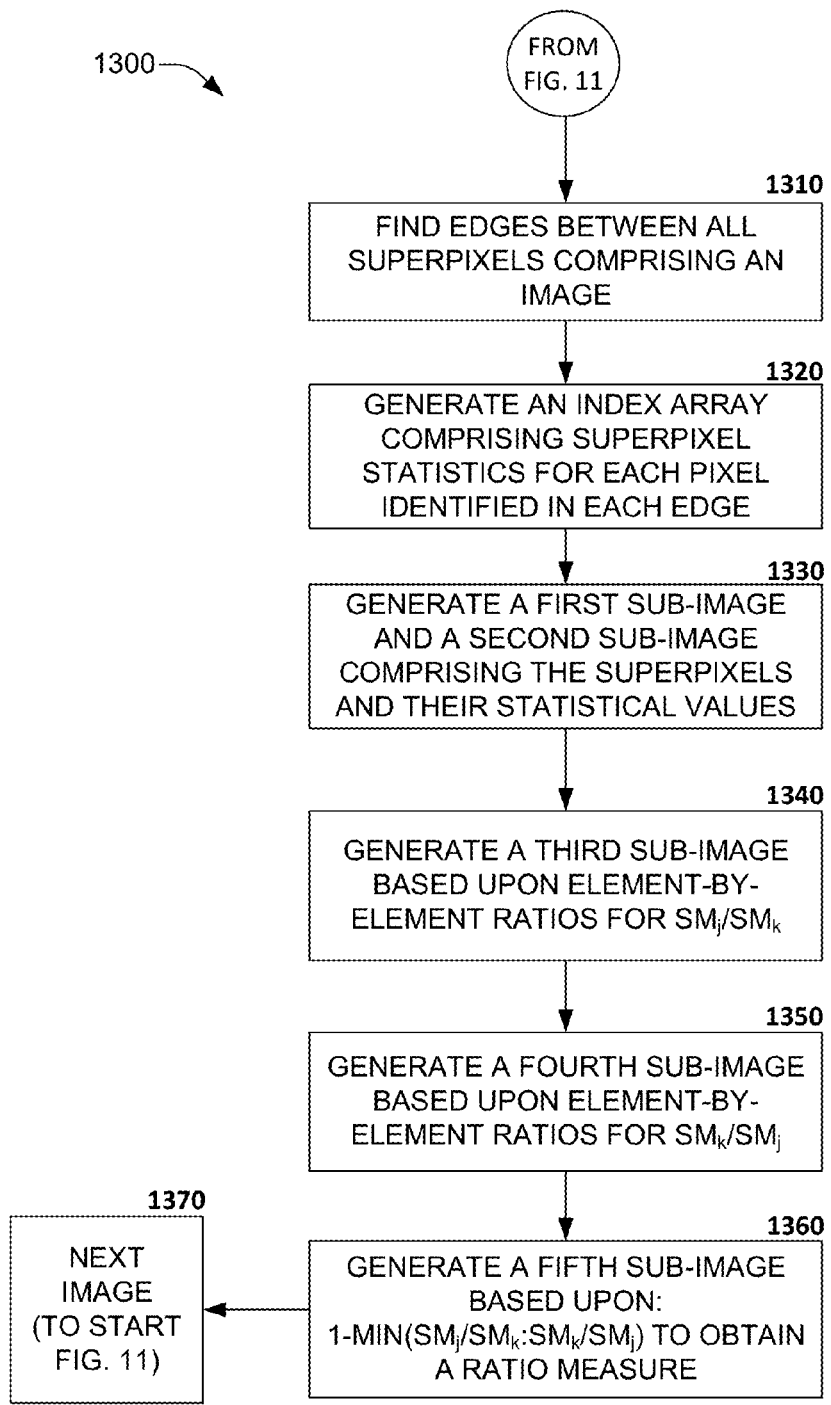
FIG. 13 is a flow diagram illustrating an exemplary methodology for determining whether an edge is an internal edge or an external edge in a SAR image.

FIGS. 11, 12 and 13 illustrate exemplary methodologies relating to determining one or more edges in a SAR image. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

FIG. 11 illustrates a methodology 1100 for removing/minimizing speckle in a radar image and dividing the image into superpixels in preparation for determination of at least one superpixel boundary. At 1110, a plurality of SAR images can be received, wherein the plurality of SAR images have been generated based upon a plurality of aircraft flybys over a common scene.

At 1120, a baseline SAR image is selected from the plurality of received SAR images.

At 1130, respective images in the plurality of received SAR images can be registered with the baseline image to form one or more registered SAR images.

At 1140, one or more SAR imaging processes are applied to the one or more registered SAR images to product an artifact-reduced SAR image product. As previously described, an originally received SAR image can include speckle, wherein the speckle can impact oversegmentation of the original SAR image. Accordingly, any of a SA-ML technique, a MCCD technique, a MRCS technique, or other suitable technique can be applied to the registered SAR image (or images) to generate an artifact-reduced SAR image product. For example, a SA-ML product can be generated and comprises smooth superpixel edges and boundaries. A 20 $\log_{10}$ of SA-ML can be utilized. The plurality of registered SAR images can be arranged to form a registered SAR image stack.

At 1150, a SPS process can be performed on the artifact-reduced SAR image product to generate an oversegmented image product. The oversegmentation process can utilize any suitable SPS process such as SLIC, QUICK-SHIFT, etc. Because SLIC can incorporate a Euclidean difference-based similarity measure, applying it to log-magnitude data is equivalent to clustering magnitude data with a ratio-based similarity measure. In an embodiment, the SLIC parameters can be adjusted to limit a size of any respective superpixels such that, for example, four to six superpixels cover a medium-sized object in a SAR image and provide sufficient size for estimating statistics, for example, 100 pixels per superpixel. Further, the oversegmentation operation can be controlled to enforce single pixel are connected to at least one of 4 immediate neighbors (in the up, down, left and right directions) and excluding diagonal connections. As previously mentioned, a unique identification (ID) label can be created for each superpixel.

At 1160, as previously described, for each superpixel in a SAR image, the pixels forming each superpixel can be tagged with an ID of the superpixel they form. For example, each pixel included in a superpixel with an ID=1 is labeled with a superpixel ID=1, while each pixel included in a superpixel with an ID=2 is labeled with a superpixel ID=2.

At 1170, statistics (superpixel statistics) can be computed for each superpixel, wherein such statistics can include mean, median and/or coefficient of variation of intensities of the image product(s) from pixels within the superpixel. One or more image(s) of superpixel statistic(s) can be created, where each superpixel has associated therewith a corresponding estimated statistic for the superpixel. Such statistics can include sample mean, median and coefficient of variation for each superpixel j, respectively (per Eqns. 1-5).

FIG. 12 illustrates a methodology 1200 for identifying one or more superpixel boundaries (edges), and determining whether the boundary is an internal or external edge. FIG. 12 is a continuation of methodology 1100.

At 1210, edge pixels for each superpixel are identified/found. An image comprising the superpixels and their respective IDs (a superpixel label image) can be shifted up, down, left and right with respect to itself, to enable extraction of locations where a superpixel ID label applied to a pixel does not match a superpixel ID label applied to an adjacent pixel. For those pixels (e.g., included in a first superpixel) at which there is an ID label mismatch with pixels included in an adjacent superpixel (e.g., included in a second superpixel), the respective pixels can be identified as corresponding to edge pixels of each superpixel that borders another superpixel. In an embodiment, utilizing SLIC can enforce 4-connected superpixels to neighbor a first superpixel, and accordingly, the edges of the superpixel border 4-connected neighbors as well. In an embodiment, the first edge pixel(s) can be included in a first superpixel identified in a first image, and the second edge pixel(s) can be included in a second superpixel identified in a second image, wherein the second image is a copy of the first image, and further, the first superpixel and the second superpixel are adjacent to each other, e.g., respective edge pixels of the first superpixel and the second superpixel form a common boundary.

At 1220, each edge pixel forming a superpixel are further assigned a superpixel ID of the superpixel adjacent to the edge pixel. Continuing the previous example, a first edge pixel has been identified, wherein the first edge pixel has been previously assigned the superpixel ID=1. The first edge pixel is further assigned the superpixel ID of the adjacent superpixel which has the superpixel ID=2. Hence, the first edge pixel is assigned the superpixel IDs 1:2. Similarly, the second edge pixel which is included in the second superpixel having the superpixel ID=2, is further assigned the superpixel ID of the adjacent superpixel which has the superpixel ID=1. Hence, the second edge pixel is assigned the superpixel IDs 2:1.

At 1230, the statistical measures determined for respective properties of each superpixel, which were computed in 1170, are assigned to the superpixel edge pixels. For the first edge pixel, having a superpixel ID pairing of 1:2, a first property for the first superpixel (superpixel ID=1) is identified for the first edge pixel, and further a second property for the second superpixel (superpixel ID=2) is identified for the first edge pixel. Based upon the assigned statistical measures, for each edge pixel in a superpixel edge segment, a ratio-contrast measure is calculated between a first statistical measure of a first property of the first superpixel and a second statistical measure of a second property of the second superpixel, per Eqn. 1.

At 1240, a ratio-contrast measure (C) determination can be made regarding how closely the first property of the first superpixel matches the second property of the second superpixel. The determination can be based upon comparing the first statistical measure of the first property with the second statistical measure of the second property, where the comparison can be based upon the contrast measure C calculated for the first statistical measure and the second statistical measure, wherein C can be below, equal to, or above a threshold value, T.

At 1250, in response to determining that the first property and the second property have similar values, (e.g., the contrast measure C is less than T) the first superpixel and the second superpixel can be considered to have similar radar-reflecting properties, and may be superpixels forming the same object.

At 1260, in response to determining that the first superpixel and the second superpixel form the same object, the edge can be identified as an internal edge. Owing to the similarity between the first property and the second property, the edge can be considered to be a low-contrast edge.

At 1270, a next edge in the SAR image can be identified and the process returns to 1210 for determination of which superpixels the edge pixels form a boundary (or portion of a boundary) and a subsequent determination can be made regarding whether the edge is an internal edge or an external edge. Wherein a subsequent pair of found superpixels respectively become the first superpixel and the second superpixel.

Returning to 1240, in response to determining that the first property and the second property are not similar, (e.g., do not match, wherein the contrast measure C is equal to, or exceeds T) the flow can proceed to 1280 where the first superpixel and the second superpixel can be considered to have contrasting (different) radar-reflecting properties, and may be superpixels forming different objects. E.g., the first superpixel may be a first object having a first radar reflecting property (e.g., a road) and the second superpixel may be a second object having a second radar reflecting property (e.g., a field of grass that borders the road).

At 1290, in response to determining that the first superpixel and the second superpixel have contrasting radar-reflecting properties, the edge pixels can be identified as being an external edge. Hence, the edge pixels can be considered to, in part, identify an outline of an object (e.g., a man-made object such as a building) in the SAR image. Owing to the difference between the first property and the second property, the edge can be considered to be a high-contrast edge.

The flow can forward to 1270 for the next edge to be selected, as previously described.

It is to be appreciated that various acts presented in FIGS. 11 and 12 can be carried out in parallel. For example, while the various acts of selecting edges, finding edge pixels, labeling edge pixels, computing edge contrasts, thresholding contrasts and declaring internal/external edges are presented in FIGS. 11 and 12 as single, step-by-step iterations for each determined edge pixel, the various acts can be applied across a whole image simultaneously for a plurality of superpixels and their respective edge pixels. Thus, referring to FIG. 13 (a continuation of methodology 1100), at 1310, when the whole image is shifted (as previously described), all of the edges are identified simultaneously.

At 1320, as a function of the image shifting process an index array can be created to identify (e.g., keep track of) every superpixel edge location and to further store the superpixel statistics in the corresponding edges.

At 1330, a first sub-image is generated comprising the superpixels and a second sub-image is generated, also comprising the superpixels, wherein respective statistics are identified for edge pixels in the first sub-image and the second sub-image. For every edge pixel of every first superpixel within the first sub-image, the first statistic of the first superpixel is assigned thereto. For every edge pixel of every first superpixel in the second image, the second statistic of the second superpixel is also assigned thereto.

At 1340, a third sub-image is generated by computing the element-by-element ratio of the first sub-image to the second sub-image, which corresponds to $SM_j/SM_k$, per Eqn 1.

At 1350, a fourth sub-image is generated by computing the element-by-element ratio of the second sub-image to the first sub-image, which corresponds to $SM_k/SM_j$, per Eqn 1. Accordingly, the third sub-image and the fourth sub-image have valid values at the edge locations (e.g., edge pixels) only, any off-edge locations (e.g., non-edge pixels) contain invalid data.

At 1360, a fifth sub-image is created by generating an element-by-element minimum between corresponding pixels of the third sub-image and the fourth sub-image, which corresponds to $$\min\left(\frac{SM_j}{SM_k}, \frac{SM_k}{SM_j}\right)$$

in Eqn. 1. Every element of the fifth image is multiplied by a constant of −1 and a constant of 1 is added, which completes the computation of the ratio contrast measure presented in Eqn 1.

Hence, per the foregoing, it is evident that each step of the algorithm presented in Eqn. 1. is completed for all acts for every pixel before proceeding to the next act. The foregoing process is amenable to parallel processing implementations and also amenable to array processing languages, such as MATLAB. Because the edges in the image-pairs remain aligned to one another and because the properties for each edge location are applied when the edges are first identified, a computational overhead of keeping track of a long list of edges and associated superpixels and properties can be mitigated.

At 1370, a new image can undergo boundary detection, wherein the methodology can return to FIG. 11, or any suitable act therebetween, based upon prior image processing.

Figure 14:
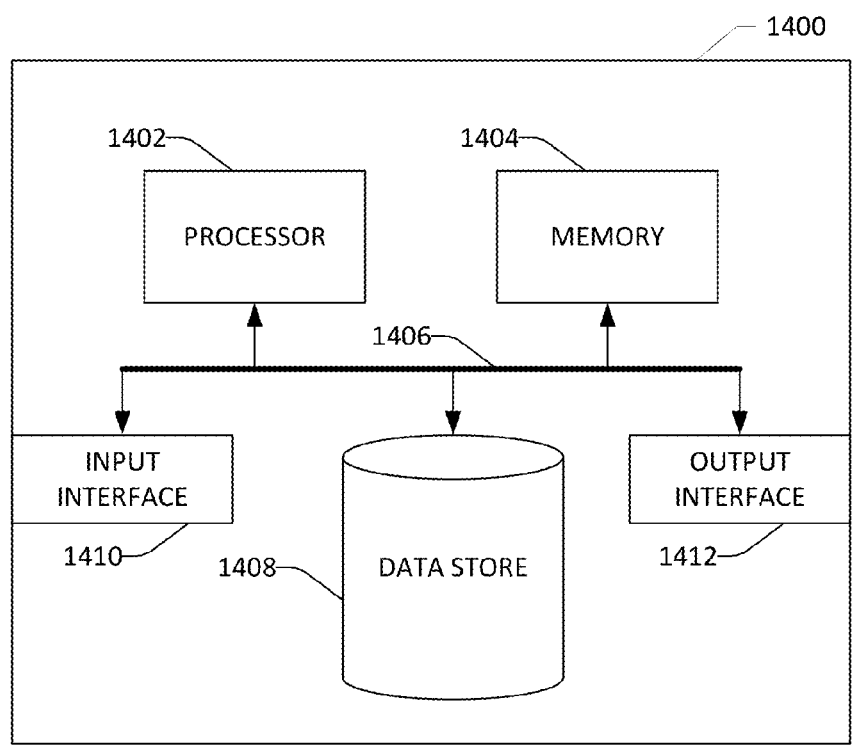
FIG. 14 illustrates an exemplary computing device.

Referring now to FIG. 14, a high-level illustration of an exemplary computing device 1400 that can be used in accordance with the systems and methodology disclosed herein is illustrated. For example, the computing device 1400 may be utilized to generate any of an artifact-reduced product 165, an oversegmented image product 175, an oversegmented image product copy 175A, a boundary detected image 188, a classified image 195, etc. For example, computing device 1400 can operate as the classification device 150, or a controller (associated with) the radar system 120. The computing device 1400 includes at least one processor 1402 that executes instructions that are stored in a memory 1404. The instructions may be, for instance, instructions for implementing functionality described as being carried out by one or more components discussed above or instructions for implementing one or more of the methods described above. The processor 1402 may access the memory 1404 by way of a system bus 1406. In addition to storing executable instructions, the memory 1404 may also store image products, SAR data, etc.

The computing device 1400 additionally includes a data store 1408 that is accessible by the processor 1402 by way of the system bus 1406. The data store 1408 may include executable instructions, image products, SAR data, etc. The computing device 1400 also includes an input interface 1410 that allows external devices to communicate with the computing device 1400. For instance, the input interface 1410 may be used to receive instructions from an external computer device, from a user, etc. The computing device 1400 also includes an output interface 1412 that interfaces the computing device 1400 with one or more external devices. For example, the computing device 1400 may display text, images, etc., by way of the output interface 1412.

Additionally, while illustrated as a single system, it is to be understood that the computing device 1400 may be a distributed system. Thus, for instance, several devices may be in communication by way of a network connection and may collectively perform tasks described as being performed by the computing device 1400.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system comprising:
   a processor; and
   memory that comprises instructions that, when executed by the processor, cause the processor to perform acts comprising:
      comparing a first property of a first superpixel assigned to a first pixel in a first radar image and a second property of a second superpixel assigned to the first pixel in the first radar image, wherein the first pixel is included in a first edge of the first superpixel; and
      in response to determining the first property and the second property are similar, identifying the first superpixel and the second superpixel as having similar radar-reflecting properties and labeling the first edge as an internal edge; or
      in response to determining the first property and the second property are dissimilar, identifying the first superpixel and the second superpixel as having contrasting radar-reflecting properties and labeling the first edge as an external edge.

2. The computing system of claim 1, wherein the first property is a contrast measure and the second property is a contrast measure.

3. The computing system of claim 1, wherein the first radar image is a synthetic aperture radar image.

4. The computing system of claim 1, wherein the determining that the first property and the second property are similar further comprising determining a contrast measure between the first property and the second property is below a threshold value.

5. The computing system of claim 1, wherein the determining that the first property and the second property are dissimilar further comprising the determining a contrast measure between the first property and the second property is above a threshold value.

6. The computing system of claim 1, the acts further comprising:
   identifying the first superpixel in the first radar image;
   labeling each pixel included in the first superpixel with a first identifier of the first superpixel;
   identifying the second superpixel in the first radar image; and
   labeling each pixel included in the second superpixel with a second identifier of the second superpixel.

7. The computing system of claim 6, the acts further comprising:
   overlaying the first radar image with a second radar image, wherein the second radar image is a copy of the first radar image, and the first radar image and the second radar image are co-aligned;
   adjusting a position of the second radar image with respect to the first radar image, wherein the position of the second radar image is adjusted by one pixel width in any of an up direction, a down direction, a right direction, or a left direction;
   detecting a first superpixel identifier (ID) of the first pixel in the first radar image is different to a second superpixel ID of a second pixel in the second radar image overlaid on the first pixel of the first image; and
   determining, based upon the difference between the first superpixel ID of the first pixel and second superpixel ID of a second pixel, the first pixel forms part of the edge of the first superpixel and the second pixel forms part of an edge of the second superpixel.

8. The computing system of claim 6, the acts further comprising:
applying the second superpixel ID to the first pixel, enabling assignment of the first property of the first superpixel and assignment of the second property of the second superpixel to the first pixel.

9. The computing system of claim 1, wherein the radar image is generated by acts further comprising:
registering a plurality of synthetic aperture radar (SAR) images to form a stack of registered SAR images;
generating an artifact-reduced SAR image product based upon at least one registered SAR image from the stack of registered SAR images, the artifact-reduced SAR image product comprises fewer artifacts than the at least one registered SAR image; and
oversegmenting the artifact-reduced SAR image product into a plurality of superpixels to form a superpixel image product.

10. The computing system of claim 9, wherein generating the artifact-reduced SAR image product comprises performing at least one of a sub-aperture multilook (SA-ML) imaging process, a mean-over-time of coherent change detection (MCCD) imaging process, or a median-over-time of radar cross section (MRCS) imaging process to the at least one registered SAR image.

11. The computing system of claim 10, wherein the first property and second property are based in part on at least one result of the SA-ML imaging process, the MCCD imaging process, or the MRCS imaging process.

12. A method comprising:
comparing a first property of a first superpixel assigned to a first pixel in a first radar image and a second property of a second superpixel assigned to the first pixel in the first radar image, wherein the first pixel is included in a first edge of the first superpixel; and
in response to determining the first property and the second property are similar, identifying the first superpixel and the second superpixel as having similar radar-reflecting properties and labeling the first edge as an internal edge; or
in response to determining the first property and the second property are dissimilar, identifying the first superpixel and the second superpixel as having contrasting radar-reflecting properties and labeling the first edge as an external edge.

13. The method of claim 12, wherein a contrast measure determines similarity between the first property and the second property.

14. The method of claim 12, wherein the first radar image is a synthetic aperture radar image.

15. The method of claim 12, wherein the determining that:
the first property and the second property are similar further comprising determining a contrast between the first property and the second property is below a threshold value; and
the first property and the second property are dissimilar further comprising the determining a contrast between the first property and the second property is above a threshold value.

16. The method of claim 12, further comprising:
identifying the first superpixel in the first radar image;
labeling each pixel included in the first superpixel with a first identifier of the first superpixel;
identifying the second superpixel in the first radar image; and
labeling each pixel included in the second superpixel with a second identifier of the second superpixel.

17. The method of claim 16, further comprising:
overlaying the first radar image with a second radar image, wherein the second radar image is a copy of the first radar image, and the first radar image and the second radar image are co-aligned;
adjusting a position of the second radar image with respect to the first radar image, wherein the position of the second radar image is adjusted by one pixel width in any of an up direction, a down direction, a right direction, or a left direction;
detecting a first superpixel identifier (ID) of the first pixel in the first radar image is different to a second superpixel ID of a second pixel in the second radar image overlaid on the first pixel of the first image;
determining, based upon the difference between the first superpixel ID of the first pixel and second superpixel ID of a second pixel, the first pixel forms part of the edge of the first superpixel and the second pixel forms part of an edge of the second superpixel; and
applying the second superpixel ID to the first pixel, enabling assignment of the first property of the first superpixel and assignment of the second property of the second superpixel to the first pixel.

18. A computer-readable storage medium comprising instructions that, when executed by a processor, cause the processor to perform acts comprising:
comparing a first property of a first superpixel assigned to a first pixel in a first radar image and a second property of a second superpixel assigned to the first pixel in the first radar image, wherein the first pixel is included in a first edge of the first superpixel;
determining a contrast between the first property and the second property is below a threshold value; and
in response to determining the first property and the second property are below the threshold value, identifying the first superpixel and the second superpixel as having similar radar-reflecting properties and labeling the first edge as an internal edge; or
determining a contrast between the first property and the second property is above the threshold value; and
in response to determining the first property and the second property are above the threshold value, identifying the first superpixel and the second superpixel as having contrasting radar-reflecting properties and labeling the first edge as an external edge.

19. The computer-readable storage medium of claim 18, the acts further comprising:
identifying the first superpixel in the first radar image;
labeling each pixel included in the first superpixel with a first identifier of the first superpixel;
identifying the second superpixel in the first radar image; and
labeling each pixel included in the second superpixel with a second identifier of the second superpixel.

20. The computer-readable storage medium of claim 19, the acts further comprising:
overlaying the first radar image with a second radar image, wherein the second radar image is a copy of the first radar image, and the first radar image and the second radar image are co-aligned;
adjusting a position of the second radar image with respect to the first radar image, wherein the position of the second radar image is adjusted by one pixel width in any of an up direction, a down direction, a right direction, or a left direction;

detecting a first superpixel identifier (ID) of the first pixel in the first radar image is different to a second superpixel ID of a second pixel in the second radar image overlaid on the first pixel of the first image;

determining, based upon the difference between the first superpixel ID of the first pixel and second superpixel ID of a second pixel, the first pixel forms part of the edge of the first superpixel and the second pixel forms part of an edge of the second superpixel; and applying the second superpixel ID to the first pixel, enabling assignment of the first property of the first superpixel and assignment of the second property of the second superpixel to the first pixel.

\* \* \* \* \*